(12) United States Patent
Poojary et al.

(10) Patent No.: US 11,147,138 B2
(45) Date of Patent: Oct. 12, 2021

(54) LIGHTING POWER SUPPLY SYSTEM AND METHOD

(71) Applicant: SIGNIFY HOLDING B.V., Eindhoven (NL)

(72) Inventors: Vasu Poojary, Eindhoven (NL); Lei Han, Eindhoven (NL); Yuhong Fang, Eindhoven (NL); Mark Ciolek, Eindhoven (NL); Venkata Sriram Pullela, Eindhoven (NL); Mahadev Cholachagudda, Eindhoven (NL); Vikram Shivanna, Eindhoven (NL); Anil Shivram Raiker, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 115 days.

(21) Appl. No.: 16/626,592

(22) PCT Filed: Jun. 22, 2018

(86) PCT No.: PCT/EP2018/066693
§ 371 (c)(1),
(2) Date: Dec. 26, 2019

(87) PCT Pub. No.: WO2019/002110
PCT Pub. Date: Jan. 3, 2019

(65) Prior Publication Data
US 2020/0163186 A1    May 21, 2020

Related U.S. Application Data

(60) Provisional application No. 62/620,078, filed on Jan. 22, 2018.

(30) Foreign Application Priority Data

Jun. 28, 2017 (IN) .............................. 201741022565
Sep. 1, 2017 (EP) ..................................... 17189040

(51) Int. Cl.
*H05B 45/37* (2020.01)
*H05B 47/115* (2020.01)
(Continued)

(52) U.S. Cl.
CPC ................ *H05B 45/37* (2020.01); *F21S 9/02* (2013.01); *H02J 7/0013* (2013.01); *H05B 45/10* (2020.01);
(Continued)

(58) Field of Classification Search
CPC .... H05B 47/19; H05B 45/3725; H05B 45/10; H05B 45/37; H05B 45/357; H05B 45/375;
(Continued)

(56) References Cited

U.S. PATENT DOCUMENTS 8,543,226 B2 * 9/2013 Shah ...................... G05B 15/02
700/22
9,784,440 B2 * 10/2017 Erdener .................. F21V 19/02
(Continued)

FOREIGN PATENT DOCUMENTS

JP      2012-164436 A    8/2012
JP      2012-190775 A    10/2012
(Continued)

*Primary Examiner* — Monica C King

(57) ABSTRACT

A power supply system for a lighting unit, comprises a driver, a local energy storage device and a converter. The converter implements a first, charging mode, mode by connecting to the output of said driver for diverting at least a part of the driving current from the lighting unit to charge the energy storage device, a second, battery driving, mode by connecting to the lighting unit for converting the local energy storage device power supply to drive the lighting unit, and a third, grid driving, mode to neither charge the energy storage device nor convert the secondary power supply. The converter and the driver are controlled actively (Continued)

and synchronously to maintain the current through the lighting unit when switching the converter between modes.

15 Claims, 8 Drawing Sheets

(51) Int. Cl.
| | |
|---|---|
| H05B 47/11 | (2020.01) |
| H05B 45/40 | (2020.01) |
| H05B 47/19 | (2020.01) |
| H05B 45/10 | (2020.01) |
| F21S 9/02 | (2006.01) |
| H02J 7/00 | (2006.01) |
| F21W 131/40 | (2006.01) |
| H02H 7/18 | (2006.01) |

(52) U.S. Cl.
CPC .............. *H05B 45/40* (2020.01); *H05B 47/11* (2020.01); *H05B 47/115* (2020.01); *H05B 47/19* (2020.01); *F21W 2131/40* (2013.01); *H02H 7/18* (2013.01)

(58) Field of Classification Search
CPC ...... H05B 45/385; H05B 47/10; H05B 47/11; H05B 47/18; H05B 33/0815; H05B 37/02; H05B 37/0272; H05B 45/00; H05B 45/12; H05B 45/18; H05B 45/325; H05B 45/345; H05B 45/38; H05B 45/382; H05B 45/39; H05B 45/40; H05B 47/105; H05B 47/165; H05B 47/17
See application file for complete search history.

(56) References Cited

U.S. PATENT DOCUMENTS

| | | |
|---|---|---|
| 2008/0297058 A1 | 12/2008 | Soos |
| 2011/0121654 A1 | 5/2011 | Recker et al. |
| 2012/0268026 A1 | 10/2012 | Crawford et al. |
| 2014/0097758 A1 | 4/2014 | Recker et al. |
| 2014/0312802 A1 | 10/2014 | Recker et al. |
| 2015/0115807 A1 | 4/2015 | Schroder et al. |
| 2016/0164283 A1 | 6/2016 | Zhao et al. |
| 2016/0301247 A1 | 10/2016 | Arulandu et al. |

FOREIGN PATENT DOCUMENTS

| | | |
|---|---|---|
| JP | 2015-088344 A | 5/2015 |
| WO | 2012059853 A1 | 5/2012 |
| WO | 2013017994 A1 | 2/2013 |
| WO | 2013132003 A1 | 9/2013 |
| WO | 2017076687 A1 | 5/2017 |

* cited by examiner

LIGHTING POWER SUPPLY SYSTEM AND METHOD

CROSS-REFERENCE TO PRIOR APPLICATIONS

This application is the U.S. National Phase application under 35 U.S.C. § 371 of International Application No. PCT/EP2018/066693, filed on Jun. 22, 2018, which claims the benefits of U.S. Patent Application No. 62/620,078, filed on Jan. 22, 2018, European Patent Application No. 17189040.3, filed on Sep. 1, 2017, and Indian Patent Application No. 201741022565, filed on Jun. 28, 2017. These applications are hereby incorporated by reference herein.

FIELD OF THE INVENTION

This invention relates to a power supply system for a lighting unit, and in particular a lighting unit having an on-board local energy store.

BACKGROUND OF THE INVENTION

The global demand of electricity is keeping the price and availability of energy at a critical point. On site electricity generation or distributed generation are being widely deployed for various applications. Local energy generation requires local energy storage.

Customer-sited (or more generally behind-the-meter, BTM) energy storage systems are not new to the commercial building sector; they have been in place in U.S. buildings for decades. Energy storage provides the flexibility to manage a load in a building or to balance load and generation in the power grid.

Most building-scale energy storage technologies are based on thermal or electrochemical storage mechanisms. From the building owner's perspective, storage enables load shifting to optimize energy costs while maintaining comfort in the building environment. From the grid operation perspective, building energy storage at a large scale could provide additional flexibility to grid operators in managing the generation variability which results from intermittent renewable energy resources, such as wind and solar generation.

Behind-the-meter energy storage is a means to provide operational flexibility within a building or in the broader context of the electric grid. Commercial building owners may invest in energy storage equipment for the sole reason of reducing the demand charge and electricity cost during peak periods, thereby reducing the demand charge component of the electricity bill. The storage will be charged during low-cost off-peak periods and then discharged during peak periods. Energy storage in buildings, therefore, remains a load management tool to generate value for the electricity service provider in exchange for a financial reward for the building owner.

This invention relates in particular to the use of energy storage in lighting systems. Local energy storage in lighting systems is of particular interest, as there is for example a timing mismatch between solar energy generation and the need for lighting in a building.

When a local energy storage system is provided, the system needs to be able to switch between different energy supplies for the load (e.g. luminaries). These modes may include a mode where there is external powering of the load (e.g. from the mains), a mode where the load is powered by the local energy source (e.g. battery or solar system), and a mode where the battery is being charged (with or without the luminaries being turned on).

A problem with lighting is that switching between these modes may result in visible flicker of the light output.

There is therefore a need for a lighting system controller which enables seamless transition between different modes of operation.

WO2012059853A1 discloses a topology wherein a capacitor can be charged, in parallel with LED, by an output of the driver, and the capacitor can be discharged to the LED when the driver can not provide power.

SUMMARY OF THE INVENTION

It is a concept of the invention to provide a power supply system for a lighting unit, which enables transitions between modes of operation (such as direct driving from the AC grid, driving from local energy storage, and energy storage charging) with little or without visible changes in light output. In particular, a converter of a battery charging system and a lighting driver are controlled actively and synchronously to maintain the current through the lighting unit when switching the converter between modes of operation. Thus, a make then break connection scheme is provided which prevents discontinuities or significant drop/increases in the current supply to the lighting load, in case the battery is to be involved between the grid and the lighting load.

The invention is defined by the claims.

Examples in accordance with an aspect of the invention provide a power supply system to be used with a lighting unit, comprising:

a driver adapted to receive an AC or DC input power supply at an input, and to convert the input power supply into a driving current at an output for supply to the lighting unit;

an interface to an energy storage device for providing an secondary power supply;

a converter adapted:
 in a first mode to connect to said output of said driver for diverting at least a part of the driving current from the lighting unit to charge the energy storage device;
 in a second mode to connect to the lighting unit for converting the secondary power supply to drive the lighting unit; and
 in a third mode to drive the lighting unit from a grid at the input without charging or discharging the energy storage device; and a controller to actively control said converter and the output of said driver synchronously to maintain the current through the lighting unit when switching the converter between the third mode and one of the first and second modes, wherein the controller, when to actively control said converter and the output of said driver synchronously when switching the converter between the third mode and the second mode, is adapted to:

obtain an output of the converter, and control the output of the driver according to the obtained output of the converter; or obtain an output of the driver, and control the output of the converter according to the obtained output of the driver.

This system has a first mode, which is an secondary energy storage charging mode ("charging mode"), and a second mode which is a supply mode for driving the lighting unit from the secondary energy storage ("battery driving mode"). A normal third mode ("grid driving mode") is when the lighting driver drives the lighting unit normally, e.g.

from the grid and the energy storage unit is not involved. By actively controlling the converter and the driver synchronously when switching between modes, the current can be maintained so as to prevent light flicker. By way of example, the switching is between the third mode (grid driving) for mid peak times and the first mode (charging) for low/off peak times, or between the third mode (grid driving) for mid peak times and the second mode (battery driving) for high peak times. Here the term "actively" and "synchronously" mean the output of the driver is controlled based on criteria, predefined in the power supply system, depending on the output/input of the converter. This excludes a passive output of the driver such as an absence of output due to grid failure, which is independent from the output/input of the converter and is not controlled by the power supply system.

The lighting unit for example comprises an LED arrangement, the driver comprises a current source LED driver with an output connectable to the LED arrangement, and in the first mode the converter is adapted to be in parallel with the LED arrangement.

This parallel arrangement means that charging the energy storage device and driving of the lighting unit can take place at the same time. Thus, in the charging (first) mode, the lighting unit may remain illuminated and the driver is delivering current able to provide driving of the lighting unit as well as charging. Similarly, all of the driver current may be used for charging if the lighting unit is off One advantage of this embodiment is that the converter can be seen as a load of the driver, and a power factor correction (PFC) circuit of the driver can be re-used, and the converter does not need a PFC circuit, which is required for a grid-powered circuit. Another advantage is the converter also has a low input voltage (which is the output voltage of the driver) and meets safety standards. A third advantage is this is easy to be added into the existing luminaire with the driver with a minor wiring change.

In a first embodiment, the controller is adapted, when to obtain an output of the converter, and control the output of the driver according to the obtained output of the converter, is adapted to: a) control the converter to output an output voltage to reach a voltage threshold of the lighting unit while said driver to output the driving current, and then control the driver not deliver the driving current, synchronously with the converter to output the driving current.

This embodiment provides a voltage sensed solution to enable the smooth transition. Since the converter's output voltage already reaches the voltage threshold of the lighting unit, it can provide the desired current very quickly after the driver stops and the flicker in the lighting unit is reduced.

The controller may be adapted to control the driver and the converter via DALI protocol. It should be noted that any other protocol, either public/standardized or proprietary, can be used.

In one preferred embodiment, the system may for example be operable in:

a first state in which the driver is adapted to deliver the driving current to the lighting unit, and the converter is adapted to, in the third (grid driving) mode, not operate;

a second state in which the driver is adapted to deliver the driving current to the lighting unit, and the converter is adapted to be in a start-up mode during which the converter is adapted to output a converter output voltage and increase a conversion ratio of the converter until the converter output voltage reaches a voltage threshold of the lighting unit; and a third state in which the converter is adapted to output the converter output voltage that has reached the voltage threshold of the lighting unit and to proceed to operate in the second (battery driving) mode, and the driver is adapted to not deliver the driving current, synchronously.

The term "states" is used to denote different configurations of the system which may be implemented in providing a transition between the fundamental three modes of the system as defined above. Thus, the states may be temporary system configurations which are employed. The states are numbered simply for identification purposes. Thus some transitions may involve a set of sequential states which do not follow in the numbering order. The fact that a sequence of states explained below includes only a non-sequential sub-set of state numbers does not imply that the missing state numbers can be assumed to be present.

This set of states provide a transition from the third (grid driving) mode to the second (battery driving) mode.

The second state enables the converter to start accumulating an energy but which does not drive the lighting unit because the voltage threshold is not reached. This provides a preparatory step, so that current/energy is ready to be delivered by the converter at the time the driver is turned off (in the third state). Here the energy may be buffered in a buffering/output capacitor of the converter.

In the third state, the converter is adapted to be switched into the loop to replace the driver, and is for example adapted to increase the conversion ratio until the driving current through the lighting unit in a preceding first state is restored in the second mode. Here the accumulated energy is released to the lighting unit and meanwhile the converter starts its current source operation. A minimum drop/variance in the lighting unit is obtained, thus the flicker is reduced by a maximum amount.

In this way, only a short and small temporary change, if any, in the current level occurs during the switching between the third and second modes, and no flicker is seen because some current (which may be very close to the desired current) is maintained during the mode switching.

In a second embodiment, a current sensed solution is provided. The controller is adapted, when to obtain an output of the converter, and control the output of the driver according to the obtained output of the converter, is adapted to: inject current into the lighting unit from the driver and the converter simultaneously; sense, in a control loop of the driver, the total current through the lighting unit including the output current of the converter; change the output current of the converter; and allow the control loop of the driver to change an output current of the converter to maintain the total current.

Alternatively, the controller is adapted, when to obtain an output of the driver, and control the output of the converter according to the obtained output of the driver, to: c) inject current into the lighting unit from the driver and the converter simultaneously; sense, in a control loop of the converter, the total current through the lighting unit including the output current of the driver; change the output current of the driver; allow the control loop of the converter to change an output current of the converter to maintain the total current.

In those two embodiments, the total current through the lighting unit is sensed and the output current of one power supply is controlled to maintain the total current, in case the other power supply changes its output current. A smooth transition can be provided since the total current is continuously regulated to be constant.

The controller may be adapted to switch the system between the first, second and third states (i.e. from the grid driving mode to the battery driving mode) in response to a high demand duration in the input power supply (so that battery driving is used when the utility rate is high) or to a demand response call from a utility providing the input power supply (so that battery driving is used to reduce the load on the grid).

In another preferred embodiment, the power supply system may be operable in:

a fourth state in which the converter is adapted to deliver the driving current in the second (battery driving) mode, and the driver is adapted to not deliver the driving current; a fifth state in which the converter is adapted to deliver the driving current to the lighting unit, and the driver is adapted to be in a start-up mode during which the driver is adapted to output a driver output voltage to reach the voltage threshold of the lighting unit; and a sixth state in which the driver is adapted to deliver the driving current to the lighting unit, and the converter is adapted to, in the third mode, not operate.

This set of states provide a transition from the second (battery driving) mode to the third (grid driving) mode.

The fifth state enables the driver to start delivering a current but which does not drive the lighting unit because the voltage threshold is not reached. This provides a preparatory step, so that current is ready to be delivered by the driver at the time the converter is turned off (in the sixth state). During switching from the battery back to the driver there may be a small dip in light output (for tens of milliseconds). However, during the changeover the driver output is available and ready.

In another embodiment, the power supply system may be operable in: a first state in which the driver is adapted to deliver the driving current to the lighting unit, and the converter is adapted to, in the third (grid driving) mode, not operate: and a seventh state in which the controller is adapted to instruct the driver to increase the driving current at the output, and to instruct the converter to start to operate in the first mode, synchronously;

wherein the converter is adapted to, in the first (charging) mode, detect the current through the lighting unit, and tune the part of the driving current from the driver diverted from the lighting unit to charge the energy storage device such that the current through the lighting unit is still constant.

This defines a solution which enables a shift from the third (grid driving) mode to the first (charging) mode while maintaining the same LED output. The driver starts to increase its output current by additional current, and the converter starts to divert the additional current synchronously. This seventh state thus draws additional current from the driver for the purposes of charging the energy storage device, but without affecting the light output. In order to provide a closed loop control to maintain a constant current in the lighting unit, the converter also controls its diverted current according to the current in the lighting unit. for example, if the current in lighting unit is less than a desired current, meaning the converter has diverted too much current, the converter would decrease its input current by for example decreasing its duty cycle of switching; and vice versa.

The controller may be adapted to operate the system from the first state to the seventh state in response to a low demand duration in the input power supply. This may correspond to a period of lower cost supply, so the charging of the energy storage device is economically efficient.

Further, the controller may be adapted to instruct the driver to increase the driving current at the output step by step, and to instruct the converter to increase the part of the driving current from the driver diverted from the lighting unit step by step, and the power supply system is operable in an eighth state in which the controller is adapted to instruct the driver to decrease the driving current at the output step by step, and to instruct the converter to decrease the part of the driving current from the driver diverted from the lighting unit step by step, synchronously.

This defines a progressive/gradual solution which enables a shift from the first (charging) mode to the third (grid driving) mode while maintaining the same LED output. Therefore the light output is not likely to vary significantly. This also defines an eighth state which gradually reduces the additional current drawn from the driver for the purposes of charging the energy storage device, without affecting the light output.

The converter is preferably a bi-directional switched mode power converter. This reduces the component count and cost of the converter.

The converter is for example a bi-directional buck/boost converter, wherein the converter is a buck converter from the output of the driver to the energy storage device and is a boost converter from the energy storage device to the lighting unit. This solution matches the typical voltage levels of the driver, the energy storage device, and the lighting unit, thus its power loss is low.

The invention also provides a luminaire comprising:
a lighting unit; and
a power supply system as defined above.

The invention also provides a lighting system comprising:
a plurality of luminaries each as defined above;
a plurality of energy storage devices, each associated with a respective luminaire via the interface; and
a remote server to communicate with the controller of the power supply system of each luminaire.

The remote server and the controller may be adapted to communicate via a wireless protocol, and said wireless protocol comprises ZigBee protocol, and the lighting system further comprises:
a ZigBee gateway adapted to connect said remote server via a wired network, and connect to said controller via the ZigBee protocol; and
wherein said controller of said luminaire comprises a DALI module to receive command in the ZigBee protocol and to control the driver and the converter via the DALI protocol.

Examples in accordance with another aspect of the invention also provide a method of controlling a power supply to lighting unit, comprising:
receiving an AC or DC input power supply, and converting the input power supply into a driving current at an output of a driver for supply to the lighting unit;
providing an secondary power supply from an energy storage device;
operating a converter of the power supply system:
in a first mode for diverting at least a part of the driving current from the lighting unit to charge the energy storage device;
in a second mode for converting the secondary power supply to drive the lighting unit; and
in a third mode for neither charging the energy storage device nor converting the secondary power supply; and
actively controlling said converter and the output of said driver synchronously to maintain the current through the lighting unit when switching the converter between the third mode and one of the first and second modes.

The method may involve the use the different states as explained above. These and other aspects of the invention will be apparent from and elucidated with reference to the embodiment(s) described hereinafter.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a power supply system for a lighting unit which comprises a driver for the lighting unit, a local energy storage device and a converter. The converter implements a first, charging mode, mode by connecting to the output of said driver for diverting at least a part of the driving current from the lighting unit to charge the energy storage device, a second, battery driving, mode by connecting to the lighting unit for converting the local energy storage device power supply to drive the lighting unit, and a third, grid driving, mode to neither charge the energy storage device nor convert the secondary power supply. The converter and the driver are controlled actively and synchronously to maintain the current through the lighting unit when switching the converter between modes.

The overall functionality of a lighting system which includes various aspects in accordance with the invention will first be described, before those aspects are then described in further detail.

Figure 1:
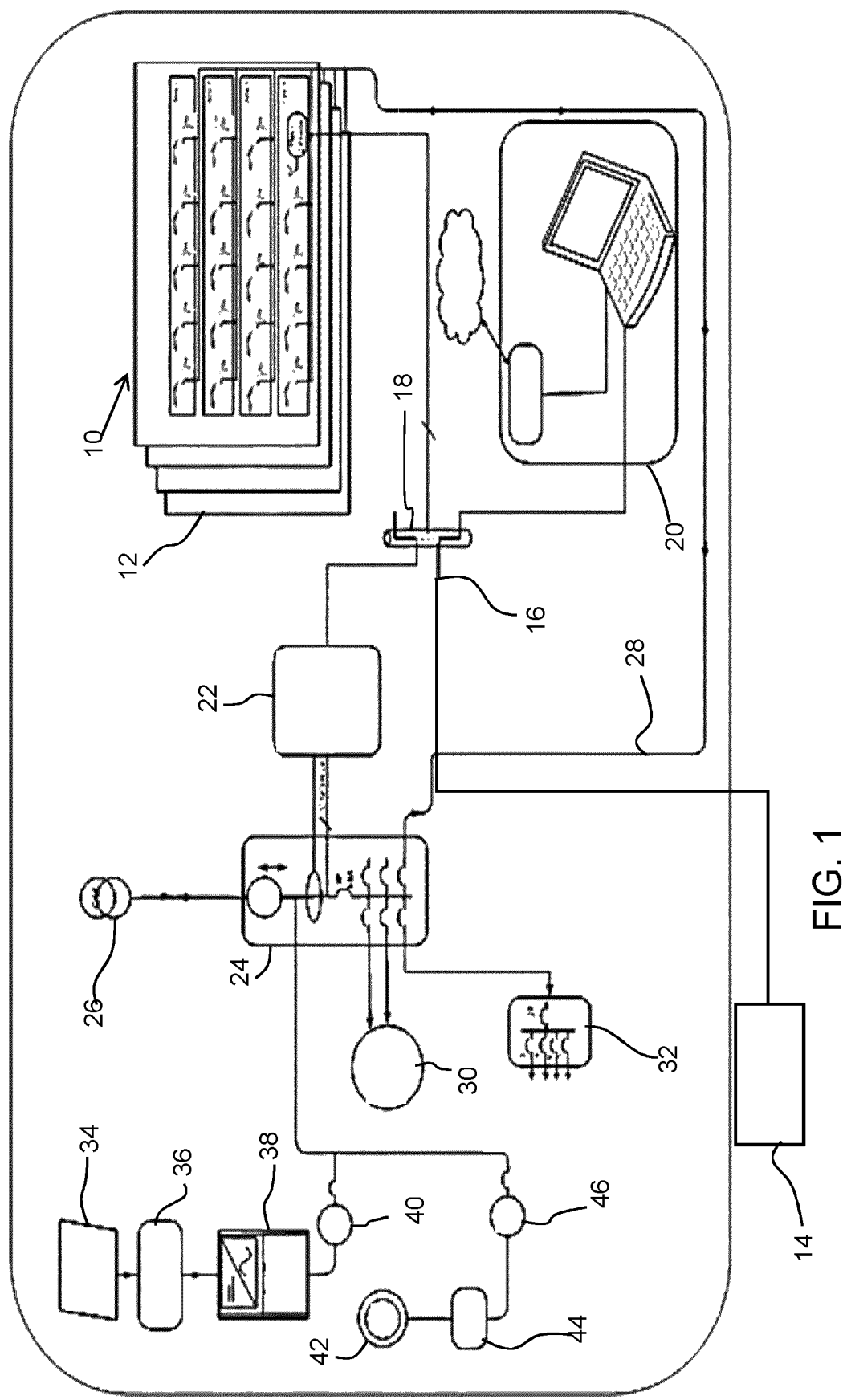
FIG. 1 shows the general structure of the lighting system.

FIG. 1 shows the general structure of the lighting system. The lighting system comprises a bank 10 of luminaries 12, wherein one or more, or each, luminaire has an integrated battery such as a Li-ion battery, which functions as a local energy storage device for providing an secondary power supply.

The luminaries 12 are controlled by a control signal from an external controller 14 over an Ethernet bus 16. An Ethernet switch 18 connects to a central energy manager 20 and to an Ethernet-capable three phase sub-meter 22. This connects to a mains AC service panel 24 which connects to the AC mains grid 26. The service panel 24 for example provides one phase 28 to power the bank 10 of luminaries, and the other phases may power other heavy loads 30 such as a lift, or HVAC (heating ventilation and air conditioning) system. The lighting load may instead be driven by two phases, i.e. 240V. A single phase 28 (or dual phase) may also be used for other loads such as IT and other pluggable loads, by means of a sub AC service panel 32.

A photovoltaic (PV) solar panel 34 and PV interface 36 connect to the mains through a grid tie inverter 38 and power meter 40, and a diesel generator 42 and diesel generator control panel 44 connect to the mains through another power meter 46.

The system is for example installed in a commercial building which has distributed energy sources such as rooftop solar power and a diesel generator or fuel cell. The system enables the feature of optimal use and selection of energy input sources to the building. The system has the advanced feature of battery integrated to luminaire fixtures, which enables the distributed energy storage in the building (i.e. behind the meter storage).

The central energy manager (CEM) 20 is an intelligent PC-based application which gathers the information from loads and different sources. The CEM optimizes the energy consumption of the building by running a built-in algorithm. The algorithm manages the dimming of lights or the switch to the secondary battery. It selects the most economical source based on the availability and rate structure.

Figure 2:
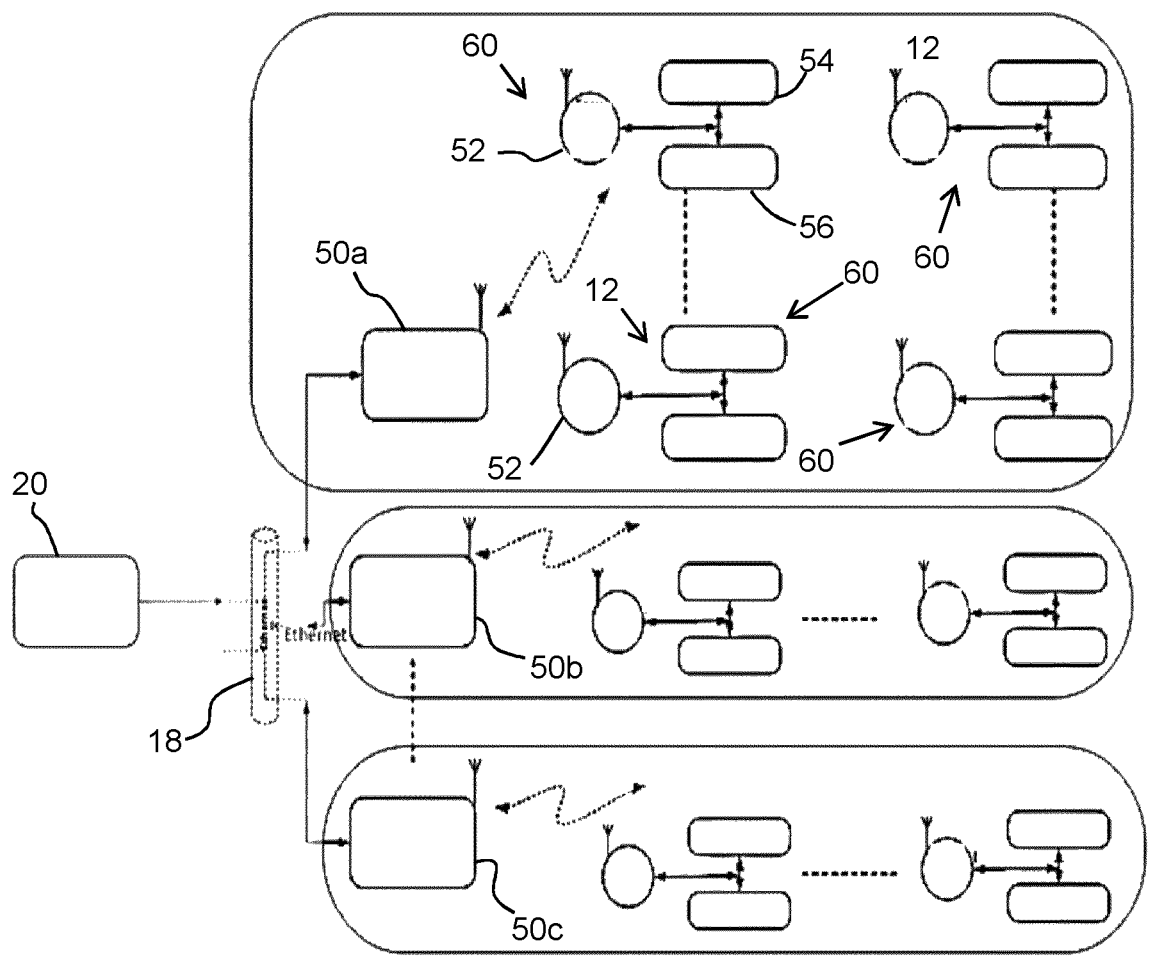
FIG. 2 shows the communication links in the system of FIG. 1.

The algorithm in the CEM enables the following functions:

Demand charge managements
Demand response
Peak load shifting
Dynamic peak load management
Selection of optimum energy source (e.g. renewable energy source) to the building FIG. 2 shows the communication links in the system of FIG. 1. The central energy manager 20 communicates with floor gateways 50a, 50b, 50c using Ethernet links. Each region in FIG. 2 thus represents a different floor of a building. Of course, this is not essential, and there may be only one zone or an area may be dividing differently. The Ethernet switch 18 is used for switching the communication bus between multiple paths. The floor gateway communicates with all luminaries 12 via ZigBee mesh networks. One gateway can communicate with multiple luminaries in a floor.

For each luminaire 12, a sensor 52 is used as communication bridge and it communicates with the floor gateway via Zigbee. The unit 52 is described below as "a sensor" (in the singular), but it should be understood that this sensor in practice includes multiple sensing modalities, and hence multiple sensor elements, which together define the overall sensor function, together with the communication function with the floor gateway.

The sensor communicates with a lighting driver 54 and a battery injection box (BIB) 56 (which is an implementation of the converter as described above and in the claims) using a DALI bus. The battery injection box controls the charging and discharging of the battery.

The combination of each driver 54, lighting unit (not shown in FIG. 2), sensor 52 and battery injector box 56 forms a lighting node 60/luminaire 12.

Figure 3:
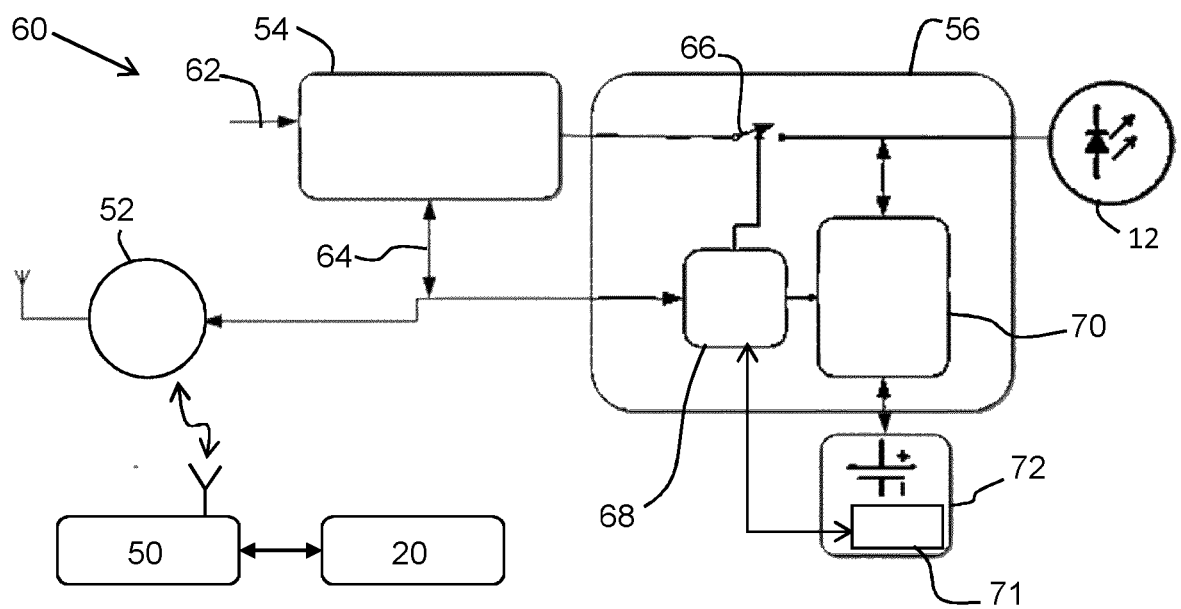
FIG. 3 the block diagram in more detail of a lighting node.

FIG. 3 is the block diagram in more detail of the lighting node 60.

The driver 54 is an AC to DC LED driver which for example works on a wide range of AC input voltage from 120V to 277V AC, hence a universal mains input 62. The output voltage is configurable in the range of 27V to 54 V DC and the output current is for example configurable from 0.1 A to 1.1 A DC. The driver 54 has a DALI bus 64 wherein the driver 54 is a DALI slave. It should be noted that the driver 54 can also be a DC grid-compatible driver which is a DC to DC LED driver.

The driver 54 is capable of dimming and switching on/off the output based on DALI commands.

The driver 54 measures the consumed power and energy through a soft metering functionality. The driver 54 powers the DALI bus 64 with 14-16V DC, 52 mA DC.

The sensor 52 provides the functionality of occupancy sensing and day light savings.
The sensor has IR & NFC (near field communication) functions for commissioning and configuring the parameters such as the luminous lighting level, PIR time out, fade-in time, fade out time etc.

The sensor 52 has an integrated ZigBee module for communication with the floor gateway and inter-luminaire communication.
The sensor has a DALI bus (functioning as the DALI master) for intra-luminaire communication (with the driver 54 and Battery Inject Box 56) and it has a non-volatile memory to store the default configuration parameters like the light level, PIR time out, fade-in time, fade out time, etc.

The sensor has a state machine to handle different mode changes of the luminaire such as a battery driving mode, grid driving mode and battery charging mode of operation.
The instantaneous power consumption data from the driver and battery injection box is communicated to the sensor via the DALI bus. The sensor periodically transfers a message on Zigbee communication media to the floor gateway. The luminaire 12 is a standard luminaire.

The battery injector box 56 is also shown in slightly more detail in FIG. 3. It comprises a connection switch 66 to select a connection with the driver, and a controller 68 which controls the switch 66. There is also a bidirectional synchronous buck-boost DC-to-DC converter 70 for example with efficiency more than 92% and connected in parallel with the output of the driver 54. A battery management circuit 71 is associated with a battery 72.

The BIB 56 receives commands from the sensor 52 via the DALI bus 64. The BIB charges the battery when it receives a charging command from the sensor, and the sensor receives a charge/discharge command (e.g. via Zigbee) from the gateway 50. The central energy manager 20 is also shown in FIG. 3, connected to the gateway 50 via Ethernet.

The BIB also discharges the battery 72 to drive the luminaire load 12 when it receives a discharge command from the CEM 20 via the floor gateway 50. Furthermore, the BIB interprets a power outage condition to switch to the battery driving mode of operation. It also switches on/off the LED output based on occupancy status received from the sensor. The BIB is for example capable of dimming the LED output from 100% to 5% based on the command received from the sensor in the battery driving mode of operation.

When power is not available from the driver 54 then the DALI bus is also powered by the BIB.

The changeover from grid driving mode to battery driving mode or from battery driving mode to grid driving mode is made seamlessly as explained further below.

The BIB has an integrated battery management algorithm to maintain the battery health and measure state of charge in real time. Using such an algorithm enables extending of the battery life by minimizing the number of charge and discharge cycles. In battery charging mode, the BIB is for example powered from a 18.5V, 8.8AH Li-ion nickel-manganese-cobalt battery 72.

The BIB includes protection features such as battery under-voltage cutoff, battery overcharge protection, over-voltage protection, protection for wrong battery connection, short circuit protection, temperature protection, LED over voltage protection and LED open circuit protection. Also, output over current protection is also provided. By way of example, the charging time of the battery during off peak time is 6 hours and it is for example capable of 5 hours of backup with full output.

Figure 4:
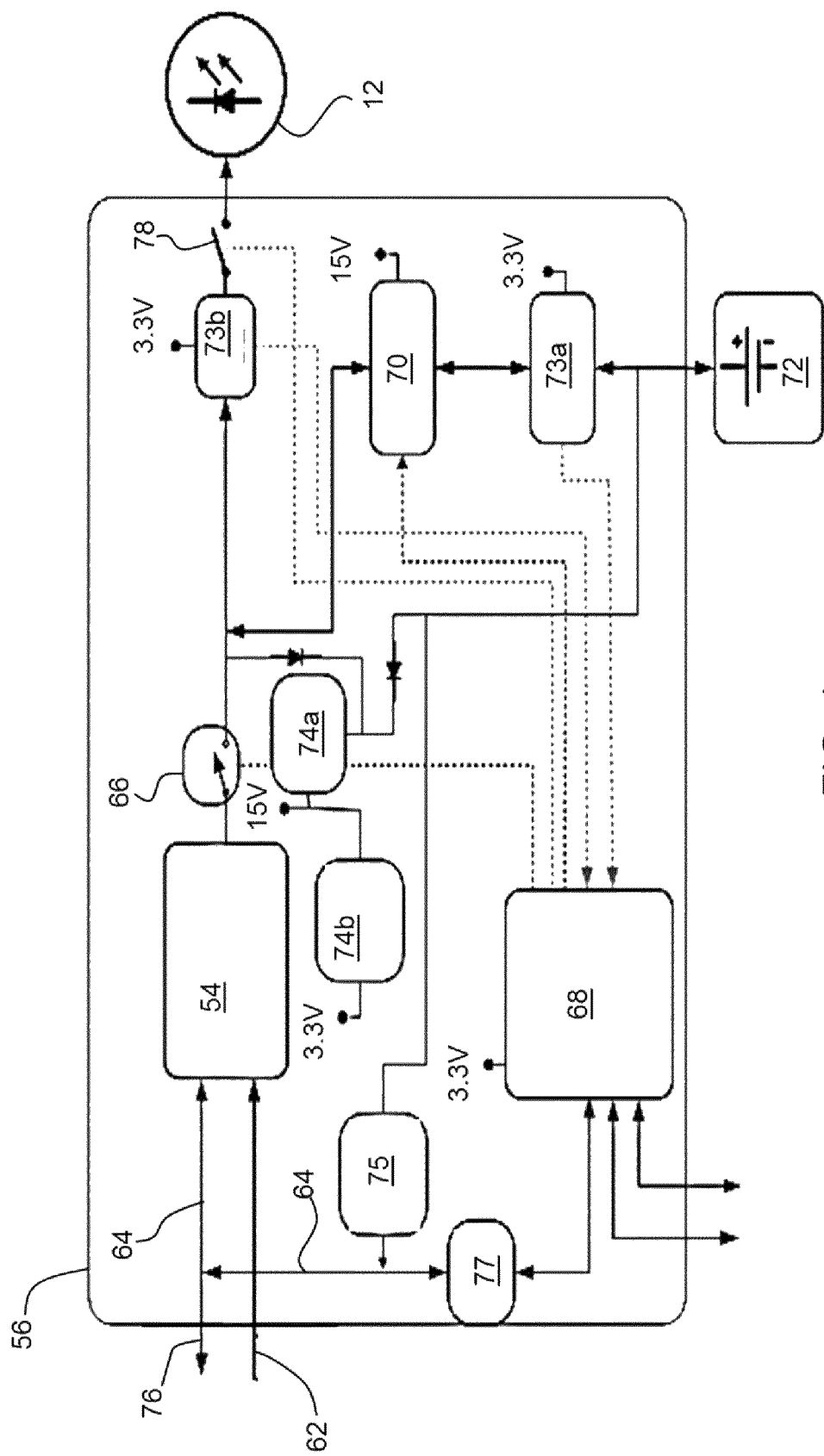
FIG. 4 shows a battery injection box in more detail.

FIG. 4 shows the BIB 56 in more detail. The same components as in FIG. 3 are given the same reference numbers. FIG. 4 additionally shows a unit 73a for battery voltage and current sensing and a unit 73b for LED voltage and current sensing. There are two auxiliary power supply circuits, one 74a for generating 15V and another 74b for generating 3.3V. These are used by other units as power supplies. There is also an isolated power supply 75 for the DALI bus 64, and there is a DALI port 76 to the bus. There is also a 2 kV isolation unit 77 between the DALI bus 64 and the microcontroller 68. There is an output switch 78 to the LED string.

The microcontroller receives sense and control inputs from the units 73a and 73b. It provides PWM signals to the converter 70 and the switch 66.

Figure 5:
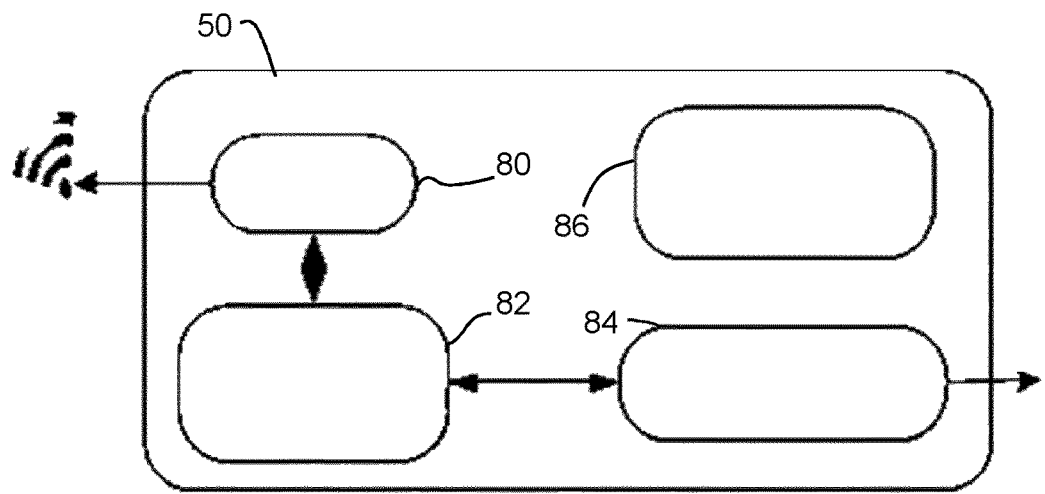
FIG. 5 shows a floor gateway in more detail.

FIG. 5 shows a floor gateway 50 in more detail. The floor gateway acts as a communication bridge between the lighting node 60 and the central energy manager 20.

It has a Zigbee module 80, a gateway controller 82, an Ethernet converter 84 and a board power supply 86.

The floor gateway has two modes of operation; a commissioning mode and a functioning mode. During installation, the gateway will enter to the commissioning mode by a user toggling a control key so that it will enter in to an open group to add the luminaire to network.

Other luminaries are triggered via RF applications to join the opened network and as many as 100 nodes can be added to one network group. Once all luminaries have joined the network then the key in the gateway is toggled again to close the loop.

Once the group is formed, the gateway sends a MAC address of all luminaries of the group to the CEM 20 for recording and maintaining the group structure. The gateway then comes out of the commissioning mode and enters the functioning mode.

In the functioning mode, the gateway is powered from an uninterruptible power source of the building. The gateway broadcasts or unicasts messages to the luminaries and it receives messages from the individual luminaries. The gateway has provision to form logical clusters from its group of luminaries and this cluster information is stored in CEM. The gateway can send multicast commands to a cluster of luminaries.

Figure 6:
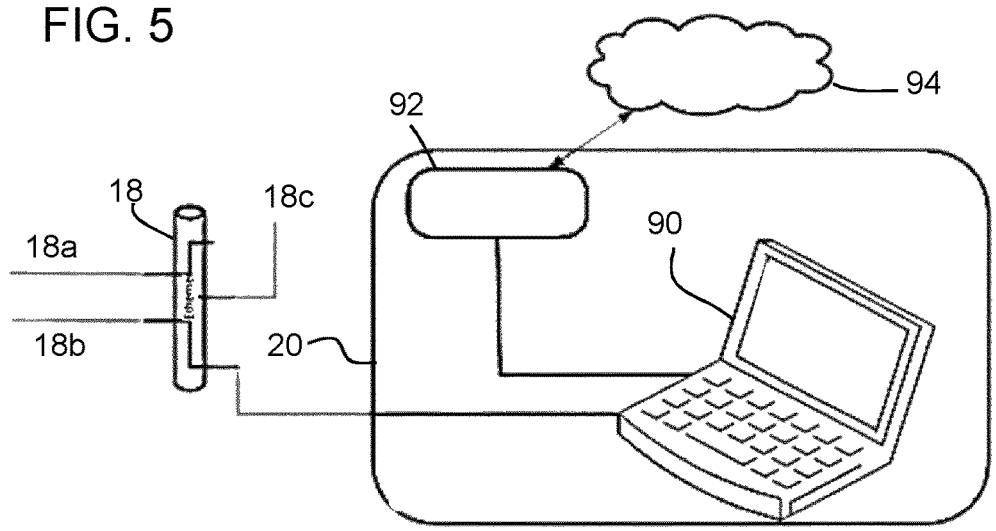
FIG. 6 shows a central energy manager in more detail.

The central energy manager (CEM) 20 is shown in more detail in FIG. 6. It is a windows based PC 90 with a demand response (DR) algorithm. A USB to Ethernet converter 92 enables wireless demand response signaling. This demand response function enables the utility provider to make demands to the system as explained further below.

The CEM 20 is connected to a private IP network and creates a TCP socket server on a pre-defined network port for connecting the floor gateway. The CEM sends commands to luminaries on this private IP network through TCP socket communication. It receives the information from luminaries through the floor gateway on the IP network in the opened TCP socket connection.

The multiple floor gateways (10 or more) are connected to the CEM 20 via the Ethernet switch 18. The Ethernet switch 18 has connections to the building energy meter (connection

18*a*), to the building management system (connection 18*b*) and to the floor gateway (connection 18*c*).

The CEM has a dedicated hardware interface, which provides secured IP connection to the utility communication for automated demand response (ADR) communication.

The interface also communicates with the building energy meter. It has a database management system (DBMS) to store the message logs received from the luminaries. The CEM also has an interface in the graphical user interface (GUI) to enter the utility rate structure. The CEM GUI for example has an option for manual override of the dimming and remote on/off control of the lighting nodes 60. It also has battery parameters, luminaire status parameters and savings obtained from demand charge and demand response events. The GUI shows the occupancy status and dimming status of individual luminaries and it sends periodically demand savings and available battery capacity to the utility.

As explained with reference to FIGS. 3 and 4, the BIB uses a synchronous bidirectional converter to charge and discharge the battery. This provides a reduced component count.

Figure 7:
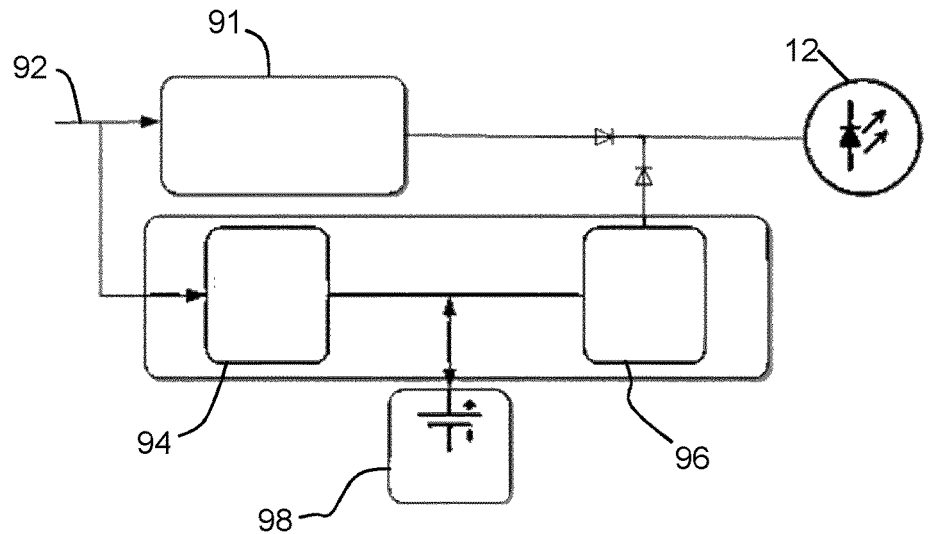
FIG. 7 shows an example of known power stages of emergency luminaries where there is a separate charge and discharge path in the battery driving mode of operation.

FIG. 7 shows an example of known power stages of emergency luminaries where there is a separate charge and discharge path in the battery driving mode of operation. FIG. 7 shows an AC to DC driver 91 which receives a universal mains input 92. In parallel is the battery module comprising a buck battery charger 94, boost LED driver 96 and the battery 98.

When the luminaire receives the command to charge the battery, the AC to DC LED driver will directly drive the LED, and the battery charger receives the input from the AC mains in parallel with LED driver. The battery charger will charge the battery based on the charge command.

When AC is not present or a battery driving mode command is given then the boost LED driver will drive the LED light output. Thus, there are separate drivers for charging and for discharging.

Figure 8:
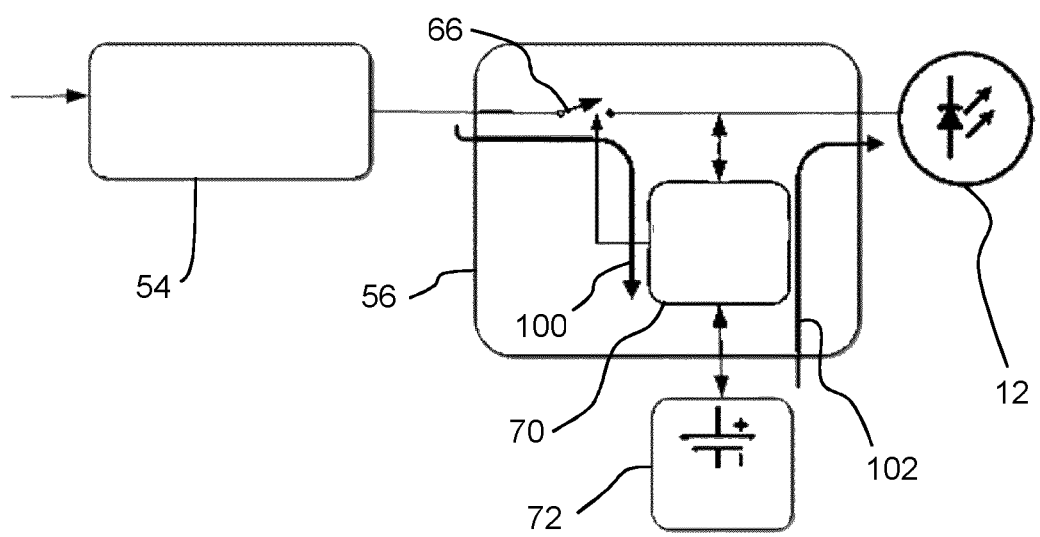
FIG. 8 shows the power stages in the battery injection box of FIGS. 3 and 4.

In order to reduce cost, FIG. 8 shows the power stages in the BIB of FIGS. 3 and 4 to show the advantages obtained. The bi-directional synchronous DC-to-DC converter 70 charges (arrow 100) or discharges (arrow 102) through the same power circuits. The BIB circuit is thus connected in parallel to the output of the driver 54. The output of the driver is used to charge the battery and the converter 70 and then works in buck converter mode. Whenever the driver output is not available, the converter 70 works in boost converter mode to drive the LED by using the battery power. The circuit structure of a bi-directional buck boost converter is known in the art.

The overall system, and in particular the lighting node, has various modes of operation which will now be discussed. In an auto scheduling mode, the CEM operates in an autonomous mode.

Figure 9:
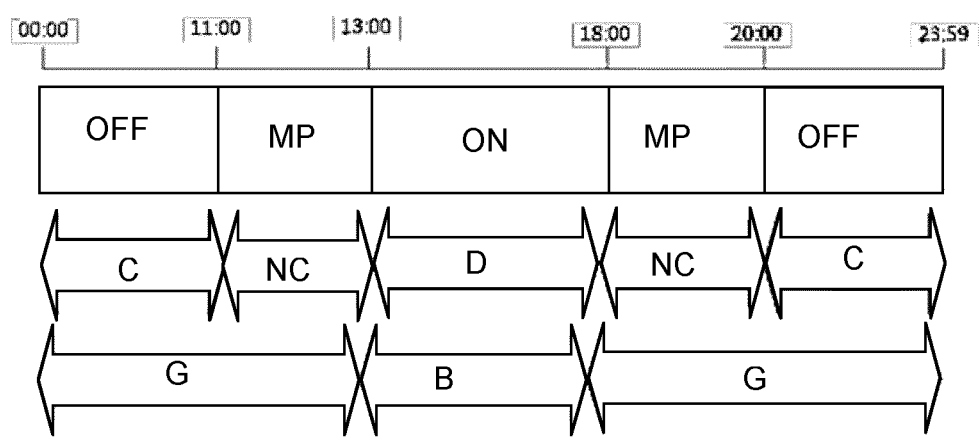
FIG. 9 shows an example for different times of use of the lighting node and its power source.

FIG. 9 shows an example for different times of use of the lighting node and its power source during that time in the autonomous mode. These modes are configurable in dependence on the utility rate structure, or can be flexibly changed according to demand response.

The top row shows the type of supply (off peak "OFF", mid peak "MP" or on peak "ON"). The time that separates the types of supply are only for example.

The middle row shows the BIB status (charge "C", neither charge nor discharge "NC", discharge "D").

The bottom row shows the luminaire power source (grid "G", battery "B").

During an off peak time, the BIB is in charge status and the luminaire is grid fed. During mid peak time, the luminaries are grid fed and there is neither charging or discharging of the battery. During on peak the luminaries are battery fed hence there is battery discharge.

The way the different units of the system operate in the three different peak categories will now be described, as well as the additional demand response mode which has been briefly mentioned above.

It is first noted that in all modes described below some units always perform certain tasks. In particular, in all modes, the sensor reads the occupancy status continuously. In the case of non-occupancy, it sends a PIR OFF command to the BIB and in the case of occupancy, it resets its PIR counter and sends a PIR ON command to the BIB and driver. The sensor reads the LED power, battery status, and mode of operation and sends this information to the floor gateway. These sensor functions are not repeated in the explanations below.

1. On Peak Time

The on peak time follows a previous mid peak time during which the luminaries were in grid driving mode. In some cases, the on peak time follows a previous off peak time during which the luminaries were also in grid driving mode.

CEM

In the CEM 20, the battery state of charge (SoC) level of all luminaries is obtained through the floor gateway 50. The CEM algorithm estimates the set dimming level required for the duration of the on peak time to operate the luminaire to work in a battery driving mode of operation. The CEM sends command to all luminaries to switch to the battery driving mode of operation through the floor gateway 50. The CEM continuously receives the battery status, instantaneous power level, mode of operation, lighting level information from the luminaries and stores them in a database.

If the SoC of any luminaries is below 20% the CEM switches that luminaire to grid driving mode of operation since an excessive discharge of the battery below 20% SoC is not good for its lifetime.

Floor Gateway

In the floor gateway 50, when the battery driving mode of operation command is received from the CEM, the gateway broadcasts battery driving mode commands to all luminaries connected to its network. The gateway periodically gets the data information from the sensor about the luminaire parameters and forwards the information to the CEM.

Sensor

In the sensor, on receiving the battery driving mode command from the gateway, the sensor reads the present light output level. It sends commands to the BIB to switch to the battery driving mode of operation and confirms the battery driving mode of operation from the BIB by reading its mode. The sensor also sends command to the driver to go to a standby mode of operation, i.e. switches off the driver output.

Driver

The driver receives commands from the sensor to go to the standby mode as explained above. It then goes into standby mode and switches off its output.

BIB

In the mid-peak time, the BIB is in a no charge status and light output is driven from the driver. In the peak time, the BIB receives the battery driving mode command from the sensor. The BIB reads the present LED current level, and battery status. If the battery SoC level is more than 20% the BIB switches the battery to battery driving mode and sets its status to discharge. In this discharge status, the BIB performs various functions:

it measures the present level of battery voltage, LED voltage and LED current;

it calculates the PWM counts required to operate the bidirectional converter 70 in a boost mode of operation to attain the same output current level;

it implements soft start of the LED current achieved by slowly increasing the PWM count to reach the calculated PWM count value; and it continuously monitors the LED current and voltage, and the battery current and voltage and these values are regulated in a closed loop.

The BIB switches off the driver output relay/switch to disconnect the driver output. It also measures the LED power, battery SoC, SoH (state of health) and sends this information as a response to a query message from the sensor periodically.

The BIB switches off the LED output on receipt of a PIR OFF command from the sensor by switching off the converter 70. Similarly, it switches on the LED output on receipt of a PIR ON command from the sensor by switching on the converter and soft starting the LED current by loading the PWM in incremental small steps. It also adjusts the LED output current based on an ambient light sensor (ALS) command received from the sensors to maintain the required lighting level.

The BIB switches off the LED output if the battery SoC reaches less than 20% or the battery voltage reaches less than 16.5V.

2. Mid Peak Time

The system can enter the mid peak time from an off peak time or from an on peak time, based on the previous mode of operation. In the mid peak time, all luminaries are in grid driving mode of operation.

2.1 the System Enters the Mid Peak from Off Peak.

CEM

The CEM 20 sends a grid driving mode command to all luminaries to switch off the charging through the floor gateway. The CEM continuously obtains the battery status, instantaneous power level, mode of operation, lighting level information from the luminaries and stores them in database.

Floor Gateway

The floor gateway 50 receives the grid driving mode command from the CEM, the gateway broadcasts grid driving mode commands to all luminaries connected to its network. The gateway periodically obtains the data information from the sensors about the luminaire parameters and forwards this to the CEM.

Sensor

In the sensor, the grid driving mode command is received from the gateway, the sensor reads the present light output level from the BIB, sends a command to the BIB to switch off the charge status and sends a new DIM level to the driver to keep the light output level same as before. The sensor confirms the grid driving mode of operation from the BIB by reading its mode.

Driver

The driver receives commands from the sensor when there is a new dimming level. The driver then changes its dim level to the new set dim level.

The driver switches off the LED output on receipt of a PIR OFF command from the sensor by switching to standby mode. It switches on the LED output on receipt of a PIR ON command from the sensor by setting the dim level to previous dim level. The driver also adjusts the LED output current based on the ALS command received from the sensor to maintain the required lighting level.

BIB

In off peak hours, the BIB was in the charge status and the driver output was used for both driving the LED and battery charging. The BIB receives the grid driving mode command from the sensor. It reads the present LED current level and responds this value to the sensor on getting a query from it. The BIB switches off the charging and LED output continues to be drawn from the driver output. The BIB then has the no charge status.

The BIB measures the LED power, battery SoC, SoH and send this information as a response to a query message from the sensor periodically.

2.2 the System Enters the Mid Peak from on Peak.

CEM

The CEM 20 sends a grid driving mode command to all luminaries to switch off the battery driving mode through the floor gateway 50. The CEM continuously obtains the battery status, instantaneous power level, mode of operation, lighting level information from the luminaries and stores them in a database.

Floor gateway.

On receiving the grid driving mode command from the CEM, the gateway broadcasts the grid driving mode commands to all luminaries connected to its network. The gateway periodically obtains data information from the sensors about the luminaire parameters and forwards this to the CEM.

Sensor

On receiving the grid driving mode command from the gateway, the sensor reads the present light output level from the BIB. It sends command to the BIB to switch off the battery driving mode and sends a new DIM level to the driver to keep the light output level same as before. It confirms the grid driving mode of operation from the BIB by reading its mode.

Driver

The driver was in standby mode and its output was off before entering the mid peak time. The driver receives commands from the sensor with a new dim level. It turns on the LED output and changes its dim level to new set dim level.

The driver switches off the LED output on receipt of a PIR OFF command from the sensor by switching to standby mode, and it switches on the LED output on receipt of a PIR ON command from the sensor by setting the dim level to previous dim level.

As before, it adjusts the LED output current based on the ALS command received from the sensor to maintain the required lighting level.

BIB

In on peak hours, the BIB had the discharge status, driving the LED output by battery discharging. It receives the grid driving mode command from the sensor. The BIB reads the present LED current level and responds this value to the sensor on getting a query from it.

The BIB switches off the converter, and goes into no charge status. It turns on the driver output by turning on the series switch 66. The BIB measures the LED power, battery SoC, SoH and send this information as response to a query message from the sensor periodically.

3. Time of Use in Off Peak

The system enters the off peak from the mid peak in which all luminaries were in the grid driving mode of operation.

CEM

The CEM sends a command to all luminaries to switch to the charge mode of operation through the floor gateway. The CEM continuously obtains the battery status, instantaneous power level, mode of operation, lighting level information from the luminaries and stores them in database.

Floor Gateway

On receiving the charge mode of operation command from the CEM, the floor gateway broadcasts charge mode commands to all luminaries connected to its network the gateway periodically obtains the data information from the sensors about the luminaire parameters and forwards this to the CEM.

Sensor

On receiving the charge mode command from the floor gateway, the sensor reads the present light output level. It sends a command to the BIB to switch to the charge mode of operation.

It sends an increased dim level in small steps to the driver so that an increased dim level is used for battery charging. The sensor closely monitors the light output level and sets the dim level primarily on the light level requirement.

The sensor sends a changed dim level to the driver (starting from the minimum dim level) and the driver output is used for only charging by the BIB during a non-occupancy condition.

Driver

The driver receives the charge mode command from the sensor. The driver receives the DIM level information from the sensor and sets the dim level accordingly. The driver ignores a PIR OFF command, since in a PIR OFF condition the driver output is used for charging the battery. The BIB handles the PIR OFF condition.

BIB

In mid peak hours, the BIB previously has the no charge status and the light output is driven from the driver. The BIB receives the charge mode command from the sensor. The BIB reads the present LED current level and initiates the battery charging process by entering the charge status.

The charging process is as follows:

The BIB measures the battery voltage and if the battery voltage is less than 16.5V then the battery charger enters into a pre-charge mode of charging:

- the BIB measures the LED current and a primary control loop keeps the LED current constant and the converter works in buck mode to initiate the charging current, for example of 150 mA for 30 minutes pre-charge time;
- the BIB monitors for a linear increase in battery voltage. If the voltage increases then the battery is considered as a healthy battery. The charging algorithm then enters a constant current (CC) mode of charging. If the battery voltage is not increased or an abrupt change in battery voltage is observed then battery is considered as faulty and an error flag is set.

If the battery voltage is initially more than 16.5V then the constant current CC mode of battery charging is initiated without the pre-charge mode.

In the CC mode of charging:

- the BIB measures the LED current and a primary control loop keeps LED current constant and increases driver's output current and the battery charging current in small steps (e.g. 100 mA).

The battery charging current will reach a maximum set limit and the converter will continue to work with this charging current to meet constant current charging.

If there is any PIR status change command received from the sensor then the battery charging current is reset to zero and the charging current starts from 100 mA.

The battery charging loop monitors the battery voltage. If the voltage reaches 20.5V then the output of the converter maintained at 20.5V and the battery charging current tapers down to provide constant voltage charging. If the battery charge current is reduced to less than 150 mA, it is considered that the battery is fully charged and battery charging is terminated.

The other steps performed in the BIB include measuring the LED power, battery SoC, SoH and sending this information as a response to a query message from the sensor periodically.

Battery charging is switched off whenever a PIR status change command is received. The LED output is switched off on receipt of a PIR OFF command from the sensor by switching off the LED switch 78 and the battery charging restarts from 100 mA (with switch 66 closed). The LED output is switched on upon receipt of a PIR ON command from the sensor by switching on the LED switch 78. Battery charging again restarts from 100 mA.

The LED output current is adjusted based on the ALS command received from the sensors to maintain the required lighting level.

4. Demand Response

A mentioned above, the system has a demand response (DR) function. This enables demand calls from the utility supplier to be made during any time slot of the day and the system responds to the DR calls by changing its mode.

A DR call is sent by the utilities company to the customer. In the case of a DR event, there will be some parameters, of which the most important ones are the DR start time and DR end time. In generally during this time the utility company expects the consumer to reduce the power consumption as much as possible. An advantage of the system is that, when it sees the start of a DR event, it will automatically switch to its secondary battery storage and removes the complete lighting load from the grid.

The functions performed by the various system components for the demand response function will now be outlined.

CEM

The CEM receives the DR call from the utility supplier.

The CEM checks its present operating peak time and stores the status before executing the DR. The CEM obtains the battery SoC level of all luminaries through the floor gateway.

The CEM algorithm estimates the set DIM level required for the duration of the DR call to operate the luminaire to work in battery driving mode of operation.

If the immediate next time period after the DR operation is the on peak, then the algorithm also considers the on peak time duration to estimate the dim level required to cover the battery driving mode of operation for the entire DR and on peak duration.

The CEM sends a command to all luminaries to switch to the battery driving mode of operation through the floor gateway.

As in the other modes, the CEM continuously obtains the battery status, instantaneous power level, mode of operation, lighting level information from the luminaries and stores them in a database.

If the SoC of any luminaire is less than 20% then the CEM switches that luminaire to a grid driving mode of operation.

Once the DR duration ends, the CEM changes the system mode to match the corresponding time of the day mode (i.e. on peak, mid peak or off peak).

Floor gateway.

On receiving the battery driving mode of operation command from the CEM, the gateway broadcasts the battery driving mode command to all luminaries connected to its network. The gateway periodically obtains the data information from the sensors about the luminaire parameters and forwards this to the CEM.

Sensor

On receiving the battery driving mode command from the gateway, the sensor reads the present light output level, sends command to the BIB to switch to the battery driving mode of operation and confirms the battery driving mode of operation from the BIB by reading its mode.

The sensor sends command to the driver to go to the standby mode of operation, i.e. switches off the driver output.

Driver

The driver receives the commands the sensor to go to standby mode. It goes to standby mode and switches off its output.

BIB

The BIB previously has the no charge status and light output is driven from the driver. The BIB receives the battery driving mode command from the sensor. It reads the present LED current level and reads the battery status. If the battery SoC level is more than 20% it switches to battery driving mode and sets its status to discharge.

The BIB measures the present level of battery voltage, LED voltage and LED current.

It then calculates the PWM counts required to operate the converter 70 in boost mode of operation to attain the same output current level.

There is a soft start of the LED current by slowly increasing the PWM count to reach the calculated PWM count value. The BIB continuously monitors the LED current, voltages, battery voltage and current and these values are regulated in a closed loop.

The BIB switches off the driver output switch 66 to disconnect the driver output. It measures the LED power, battery SoC, SoH and sends this information as a response to a query message from the sensor periodically.

The LED output is switched off on receipt of PIR OFF command from the sensor by switching off the bidirectional converter 70.

The BIB switches on the LED output on receipt of a PIR ON command from the sensor by switching on the converter and soft starting the LED current by loading the PWM in incremental small steps. It adjusts the LED output current based on the ALS command received from the sensors to maintain the required lighting level. The BIB switches OFF the LED output if the battery SoC reaches less than 20% or the battery voltage reaches less than 16.5V.

5. Manual Scheduling Mode.

The system can also be configured to work in a manual mode where the facility manager can set/change the operating mode of the system. A facility manager can control these parameters in the user interface of the CEM and can for example change the luminaire mode to charge mode or battery driving mode, or change the dim level/light level of luminaire, or switch on/off the luminaire in groups or by individual control.

One significant aspect of the invention is the seamless transfer of the power source i.e. among the battery output and the driver output to the lighting unit. The light output is driven by one of the two sources at any time i.e. either AC mains through the driver or battery through the bidirectional converter 70 of the BIB.

In a conventional changeover routine of the power source, one is disconnected before connection of the other source (break before make) to avoid any inrush current. However, this results in a discontinuity in the light output and user observes a flicker or flash in the light output.

The BIB algorithm uses steps as explained below to enable a seamless transfer of the power source.

The BIB receives the command for the battery driving mode of operation from the sensor. The BIB measures the present level of LED current delivered by the driver and measures the LED voltage and battery voltage.

The BIB then turns on the bidirectional converter 70 and loads the PWM count with the calculated value. The converter then functions in boost mode.

The BIB then disconnects the driver output and the converter output will start feeding the LED current. The PWM count is then adjusted so that the LED current level is reached, so that the LED brightness level in battery driving mode is same as in the previous grid driving mode of working.

In this procedure, before disconnecting the driver output form the LED, the converter of the BIB is activated and its power/output voltage is available. This provides a make while break procedure. This ensures that there is continuous current flow in the LED string and there is no discontinuity in light output.

Figure 10:
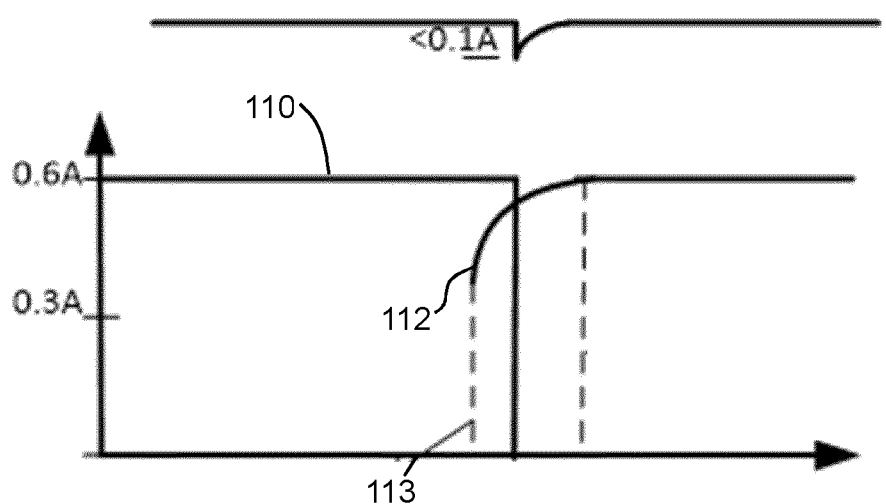
FIG. 10 shows the current transition between the two sources used in the system as current versus time.

FIG. 10 shows the current transition between the two sources. It plots current versus time. Plot 110 is the driver output current. In advance of the driver output current switching off, the converter starts to operate in increasing its output voltage, starting at time 113 in advance of the switching off of the driver. When the output voltage of the converter has reached the forward voltage of the LEDs, the switch 66 can be turned off and the converter takes over to supply the LED current. The top plot shows the resultant LED current 112. After the driver current ceases, the BIB output current stabilizes to the previous current level. The drop in current during changeover is shown as less than 0.1 A.

In an alternative implementation, two diodes can be used in forward direction respectively from the driver and the converter to the LEDs. The diode of the converter is biased by a higher voltage provided by the driver, so this diode is not conductive. After the driver is turned off, the higher bias voltage provided by the driver is gone, and the diode conducts and the converter's output voltage/current goes to the LEDs.

Before the BIB takes over, the BIB switching current (freewheel current output by the switching inductor of the bidirectional converter) flows to a buffer capacitor so that when the voltage at the buffer capacitor of the converter 70 is not sufficient to reach the forward voltage of the LED string, the output current of the BIB 56 flows to the storage capacitor. Power may similarly be stored in the switching inductor of the bidirectional converter while it is not driving the LED load.

When, or just before, the bidirectional converter output voltage reaches the LED string voltage, the driver is turned off, and the bidirectional converter takes over.

Once the driver output is switched off, only the BIB current will form the LED current, and at this moment there may be a small drop in LED current before it stable.

Figure 11:
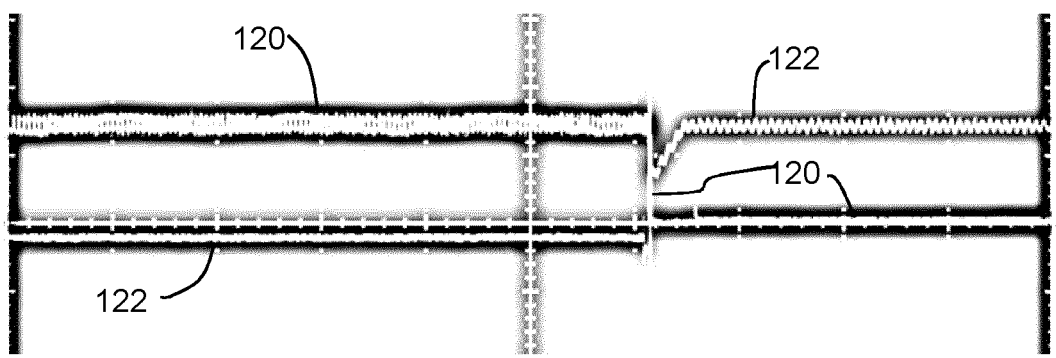
FIG. 11 shows a first captured waveform during the changeover of FIG. 10.

FIG. 11 shows a captured waveform during the changeover. Plot 120 is the driver output current and plot 122 is the battery discharge current. There is a slope in battery discharge current and but it does not cause any overcurrent in the LED output current.

Figure 12:
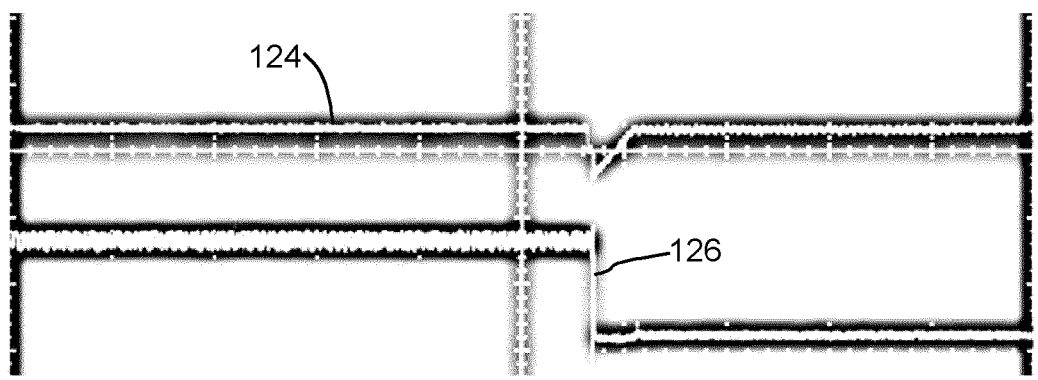
FIG. 12 shows a second captured waveform during the changeover of FIG. 10.

This can also be seen from FIG. 12 in which plot 124 is the LED current which is the superimposed output of the driver and the BIB. Plot 126 is the driver output current. It is clear that the slow rise of the BIB output current is not causing any overshoot problem in LED current.

Since the BIB is a plug in module to the driver, there is no feedback (current reference) from the BIB to the driver. The driver output current is controlled only through DALI commands. The slow raise algorithm in the BIB ensures that a minimum change in the LED current is seen without requiring feedback control.

In an alternative solution. the BIB and the driver may both inject current into the lighting unit simultaneously during the switching between different modes for a small-variance in the transition, and BIB and the driver are co-related in detecting the current to the LEDs and regulate their output current.

Embodiment 1

In a control loop of the driver, the total current through the lighting unit including the output current of the converter is sensed;

the controller changes the output current of the converter; and the controller allows the control loop of the driver to change an output current of the converter to maintain the total current, since the control loop of the driver is still a close loop control.

Figure 14:
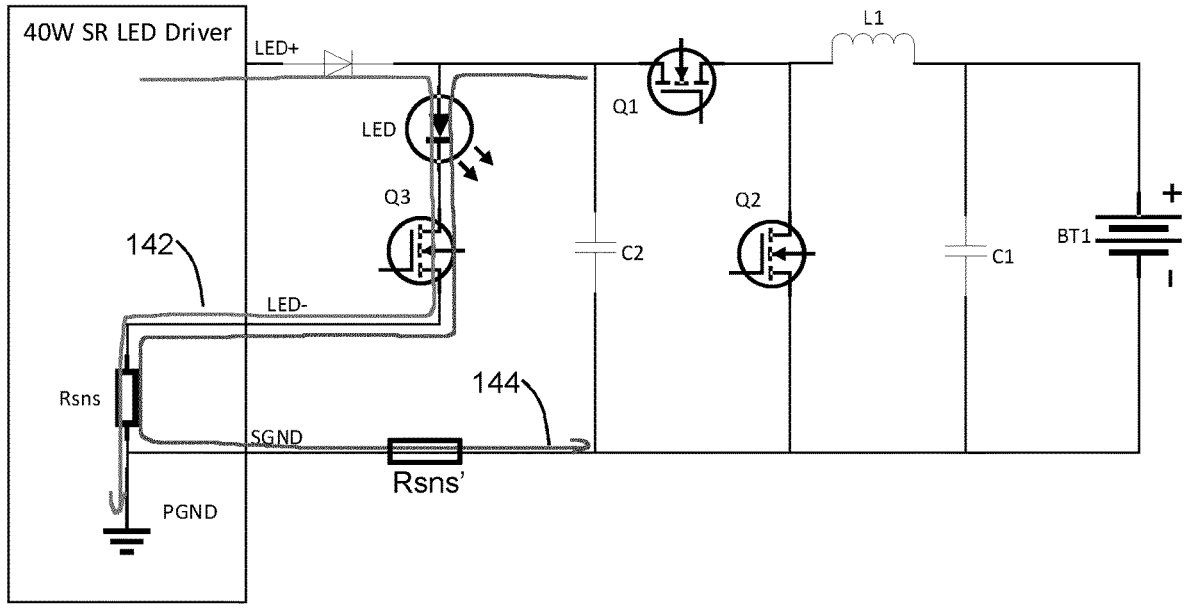
FIG. 14 shows a topology allowing a cross-current control between the driver and the converter.

FIG. 14 shows an implementation. The 40 W SR LED driver is a driver that convert AC or DC grid power to the LEDs. It has three pins that are accessible from outside. LED+ and LED− pins are for connecting to the anode and the cathode of LEDs on an LED module. SGND pin is present in many LED drivers and is originally for receiving a set signal on the LED module such as the current information to be delivered to the LEDs. The driver sets its current reference based on the set signal detected on the SGND pin. The set signal may be provided via the LED+ pin and the SGND pin, and the LED module may have a resistor connected between the LED+ pin and the SGND pin and the resistance of the resistor is indicative of the set signal. The driver is adapted to detect the resistance. This is generally known thus the present application would not give further details. The converter of the battery is connected to the LED+ pin and the SGND pin. Since in the driver, the sensing resistor of the control loop of the driver is between LED− pin and the SGND, the converter's current into the LED flows through the sensing resistor of the control loop before it returns to the battery converter. The driver can sense the sum of the current provided by the driver and the current provided by the battery converter.

More specifically, when the system is in third/grid mode, the LED driver is being used to power the LED loads. The arrow 142 shows the current flow path. The current flows out of LED+ wire from the driver, through D1 and then flows to the LED load, and returns through Q3, which can be used to disconnect the load in case of fault conditions, and then flows back into LED− wire of the LED driver, and finally flows through its internal sense resistor Rsns and back to the power ground. The driver alone controls its output current.

When the system is in second/battery discharging mode, the BIB/battery converter is being used to power the LED loads. The arrow 144 shows the current flow path. The current flows out of C2 of the BIB, and flows to the LED load, and returns through Q3, and then flows through the sense resistor Rsns of the LED driver from LED− to SGND, and then returns to C2 of the BIB through the battery converter/BIB's sense resistor Rsns'. The battery converter alone controls its output current. Though the current flows through the Rsns of the driver, the driver is turned off via control signal thus would not be active.

During mode transition between the third mode and the second mode, both the LED driver and the BIB contribute to the current that goes through the LED loads. For instance, if there is a need to transition from third mode to second mode, the BIB starts to ramp up its output current from zero, and injects the current into the sense resistor of the LED driver from LED− to SGND. The control loop of the battery converter with the Rsns' senses the current from the battery and regulates it. Since this battery current flows through Rsns of the control loop of the driver, the current that is generated from the LED driver starts to decrease automatically thanks to the closed loop of the LED driver that keeps the LED current through the sensing resistor Rsns constant. Eventually, when the current from the BIB reaches the current regulation threshold of the LED driver, the closed loop would inhibit the operation of the output stage of the LED driver, thus, the LED driver can be turned off safely without causing any or substantial current disruption.

In the case of transitioning from third mode to second mode, the LED driver can be turned on first, although it wouldn't contribute any current to the LED load initially, because the BIB provides the sufficient LED current. The BIB is controlled to start to ramp down its output current that is being injected into the LED and the sense resistor Rsns of the SR LED driver from LED− to SGND, the current generated from the SR LED driver would start to increase automatically because the closed loop of the SR LED driver is always trying to keep the total LED current constant. Eventually, when the BIB output is decreasing down to zero, the SR LED driver's output current is almost reaching its regulation threshold, thus completing a natural current commutation without any disruption.

In this topology, when there is a need to charge the battery from the driver's output, the current flows out of LED+ of the SR driver, goes through BIB, and then returns back into SGND of the SR driver. This way, the charging operation is not being regulated by the closed loop of the SR LED driver, but the closed loop of the LED driver would response to the charging operation. More specially, the controller controls the BIB to increase the charging current gradually, and current drawn from the LED increases, the driver would increase its output current to maintain the LED current.

Alternatively, the driver can sense the current provided by the converter alone, and do a calculation to find a reference current of the driver to allow a constant LED current. The driver dynamically changes a reference current, in case the converter's current is gradually reduced or increased during the transition. Thus the LED current is constant duration the transition.

Embodiment 2 inject current into the lighting unit from the driver and the converter simultaneously;

sense, in a control loop of the converter, the total current through the lighting unit including the output current of the driver;

change the output current of the driver;

allow the control loop of the converter to change an output current of the converter to maintain the total current.

Figure 15:
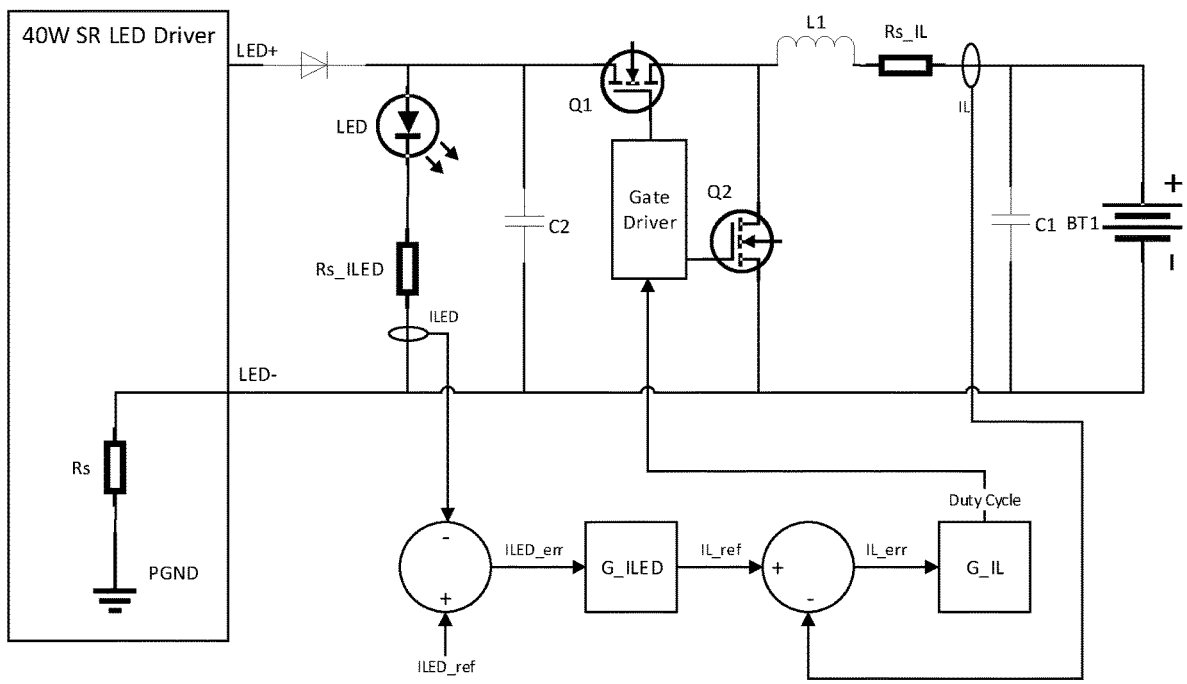
FIG. 15 shows another topology allowing a cross-current control between the driver and the converter.

In the above embodiment 1, the driver senses the total current. In this embodiment 2, the converter senses the total current. FIG. 15 shows one topology implementing the above solution. The driver has two output pin LED+ and LED− to be connected to the anode and cathode of the LEDs of the LED modules. Here there is an additional current sense resistor Rs_ILED for the converter/BIB between the cathode of the LED and the LED− pin. The converter/BIB's positive and negative output pins connected to the LED+ pin and the LED− pin of the driver. In this case, the sense resistor Rs_ILED is capable of sensing the sum of the current provided by the driver and the current provided by the converter/BIB. To implement this topology, the LED module can be adapted with the current sense resistor Rs_ILED and with an interface to provide the voltage across the Rs_ILED, indicative of the total current, to the BIB. Alternatively, the current sense resistor Rs_ILED can be placed in the BIB module, and the cathode of the LED in the LED module does not directly connect to the LED-pin, but connects to the BIB module which then connects to the LED− pin such that the current sense resistor Rs_ILED is placed in series between the LED and the LED− pin.

It allows for current mixing from both internal/driver and external/battery. The total current through the LED is sensed and used for control the battery converter. This allows smooth and automatic current flow direction control, which was not achievable using traditional control methods.

More preferably, the converter is average current mode control type. It consists of an inner loop that controls the inductor current, and an outer loop that controls the LED current. The outer loop senses the total LED current (ILED) and compares against the reference LED current (ILED_ref), and the error (ILED_err) goes through a compensator (G_ILED) that generates reference inductor current (IL_ref). The inner loop senses the inductor current from the battery (it can also senses the current to charge the battery during the first mode which will be discussed later) and compares against the reference inductor current (IL_ref), and the error (IL_err) goes through a compensator (G_IL) that generates the proper duty cycle to drive Q1 and Q2.

When the system is in third/grid mode, the SR LED driver is being used to power the LED loads. The current flows out of LED+ wire from the SR driver into the BIB. It goes through D1 and then flows to the LED load, and returns back into LED− wire of the SR LED driver, and finally flows through its internal sense resistor Rs and back to the power ground. The control loop of the driver with the sense resistor Rs maintains the constant LED current.

When the system is in second/battery mode, the BIB is being used to power the LED loads. The current flows out of C2 of the BIB, and flows to the LED load, and through the sense resistor Rs_ILED of the BIB, and then back to C2 of the BIB. The control loop of the BIB/converter with the sense resistor Rs_ILED maintains the constant LED current. The reference LED current sets the actual LED current. For instance, the reference LED current is set to 600 mA, and assume inductor current flowing away from the battery is positive. If the SR LED driver is disabled, then the total 600 mA needs to all come from the BIB, under which the outer loop would generate a positive reference inductor current, thus, the inductor current flow direction is out of the battery side thanks to the inner loop. Consequently, the system is in third mode.

Switching from the third mode to the second mode, the SR LED driver starts to ramp up its output current, and the driver's current is being injected into the BIB's current sense resistor. The outer loop would lower the positive reference inductor current to keep the total LED current constant, and the inner loop would decrease the inductor current accordingly so that the contribution to the total LED current from the BIB is reduced. When the SR LED driver output current reaches exactly the reference LED current (600 mA), then the outer loop would output zero reference inductor current. Thanks to the inner loop, the power stage works at a critical duty cycle where there is no net current that either flows into or out of the battery. This completes the current commutation process from the BIB to the SR LED driver side.

Switching from the third mode to the second mode, the SR LED driver starts to ramp down its output current from 600 mA, then the outer loop would increase the positive reference inductor current to keep the total LED current constant, and the inner loop would increase the inductor current accordingly so that the contribution to the total LED current from the BIB is increased. This process continues until the SR LED driver completely ramps down its output current to zero, thus it can be safely disabled without causing any LED current disruption. This completes the current commutation process from the SR LED driver to the BIB side.

In case of further charging the battery from the driver, the SR LED driver further increases its output current after having reached the reference LED current target (600 mA), then the outer loop would generate a negative reference inductor current, so that the inner loop would force the inductor current to flow into the battery side, thus forming certain charging current. Under this condition, the system is charging the battery while powering the LED load. The BIB draws current from the LED by an amount that still makes the LED current is the current target.

Alternatively, the converter can sense the current provided by the driver alone, and do a calculation to find a reference current of the converter to allow a constant LED current. The converter dynamically changes a reference current, in case the driver's current is gradually reduced or increased during the transition. Thus the LED current is constant duration the transition.

The advantages of this embodiment are listed below.
1) It is compatible with any LED driver. It doesn't rely on SGND node like in the embodiment 1
2) The unified controller algorithm can take care of charging and discharging and manages the current flow direction automatically. Since it doesn't suffer from current sense errors, smooth mode transitions among third mode, second mode, and first mode is achievable. It also supports charging the battery while power the LED load with no LED current flicking.
3) Dual loop topology in the BIB ensures both fast transient response and highly accurate current regulation. Average current mode control simplifies the feedback compensation design and the system doesn't suffer from double pole effect. Alternatively, a single loop in the BIB is also applicable.
4) During steady state, the average inductor current equals to the battery current. Thus, controlling the inductor current is equivalently controlling the battery charging and discharging current. This simplifies the design of the battery charging algorithm.

For charging the battery from the driver, the LED driving current is the primary current loop in the BIB and excess output power after regulation of LED current is used for battery charging. The system control loop (running in the sensor) will increase the driver output current.

It can be seen from the description above that the converter 70 in the BIB is adapted:
in a first mode to connect to the output of the driver for diverting at least a part of the driving current from the lighting unit to charge the energy storage device. This is the charging mode for example during off peak times;
in a second mode to connect to the lighting unit for converting the secondary power supply to drive the lighting unit. This is the battery driving mode for example during on peak times; and in a third mode to neither charge the energy storage device nor convert the secondary power supply. This is the normal LED drive mode (grid driving mode) with no battery charging or discharging The system has a controller (in the sensor) which actively controls the converter 70 and the output of the driver 54 synchronously to maintain the current through the lighting unit when switching the converter between the third mode and one of the first and second modes, i.e. when switching from mid peak to on peak or off peak times.

By controlling the converter and the driver when switching between modes, the current can be maintained so as to prevent light flicker.

In the first mode (off peak battery charging and grid supply) the converter is adapted to be in parallel with the LED arrangement.

In the different modes and when transitioning between the modes, the converter 70 has different functions, and these different functional configurations are described as "states" in this document, to distinguish from the more general "modes" of operation of the overall system. In a first state, the driver delivers the driving current to the lighting unit, and the converter does not operate. This state applies to the third (grid driving) mode.

In a second state, the driver delivers the driving current to the lighting unit, and the converter is in a start-up mode during which the converter outputs a converter output voltage and increases a conversion ratio of the converter until the converter output voltage reaches a voltage threshold of the lighting unit. This corresponds to the slow increase of converter output with the output voltage below the lighting unit threshold.

In a third state, the converter outputs a converter output voltage that has reached the voltage threshold of the lighting unit, and the system then proceeds to operate in the second (battery driving) mode. The driver then no longer delivers the driving current. This takes place synchronously by which is meant there is not a break then make function, but a make then break function.

In the third state, the converter increases the conversion ratio further until the driving current through the lighting unit which was present in the first state is restored in the second (battery driving) mode. This corresponds to the increase in current after the small dip as shown in FIG. 10.

The system is switched between the first, second and third states in response to a high demand duration (on peak) in the input power supply or to a demand response call from a utility providing the input power supply.

This set of states provides a smooth transition to the battery driving mode.

A corresponding set of states provides a smooth transition to the grid driving mode from the battery driving mode.

For this purpose, there is a fourth state in which the converter is adapted to deliver the driving current in the second (battery driving) mode, and the driver is adapted to not deliver the driving current.

In a fifth state, the converter is adapted to deliver the driving current to the lighting unit, and the driver is adapted to be in a start-up mode during which the driver is adapted to output a driver output voltage to reach the voltage threshold of the lighting unit. Thus, the driver output current is ramped up as a preparatory stage.

In a sixth state, the driver is adapted to deliver the driving current to the lighting unit, and the converter is adapted to, in the third (grid driving) mode, not operate.

Another set of states provides a smooth transition from the grid driving mode to the battery driving mode.

There is the first state in which the driver is adapted to deliver the driving current to the lighting unit, and the converter is adapted to, in the grid driving mode, not operate. In a seventh state the controller instructs the driver to increase the driving current at the output, and to instruct the converter to start to operate in the first (charging) mode, synchronously.

The converter is adapted to, in the first (charging) mode, detect the current through the lighting unit, and tune the part of the driving current from the driver diverted from the lighting unit to charge the energy storage device such that the current through the lighting unit is still constant.

In this way, the charging function does not alter the light output. The battery charging may start with a very small current e.g. 50 mA and increase in small steps of e.g. 50 mA. While increasing the battery charging current, the sensor will increase the driver output current (through DALI commands) so that no change in LED current is present while the battery charging current is increasing.

During the changeover in converter status from charge to no charge, the driver output power is also reduced to maintain the LED output constant and charging is thus slowly terminated. For this purpose, there is an eighth state in which the controller is adapted to instruct the driver to decrease the driving current at the output step by step, and to instruct the converter to decrease the part of the driving current from the driver diverted from the lighting unit step by step, synchronously.

There are battery commissioning features which keep track of battery. The BIB communicates with the battery via a serial bus. The batteries have an in-built unique identification number and the BIB reads this number whenever battery is connected.

The BIB keeps track of battery connected to it by reading the battery identification number and once system is been commissioned, thereafter BIB and battery are coupled to each other.

If battery is changed in-between then the BIB sends an alert to the central energy manager about the change in battery. If this change is planned/intended then the BIB configures the new battery to its discharge requirements.

The BIB has a non-volatile memory which stores the battery identification number against its own ID number and battery commissioning parameters like: charge voltage, discharge current, protection thresholds, control points for battery management and the capacity of the battery in terms of Amp hours and wattage.

Whenever the battery is disconnected and reconnected, it reads the battery identification number via the serial bus and verifies for a valid battery pack.

A database in the CEM maintains a logged list of the battery and BIB identification number and this data will be used for commissioning and planning of maintenance and service.

6. Battery Commissioning and Identification Features

The battery commissioning features will now be discussed, in particular with reference to FIG. 3 which shows the responsible battery management circuit 71.

The battery Injector Box (BIB) communicates with the battery management circuit (BMC) via a serial bus (such as the system management bus protocol, "SMbus").

The battery pack has an in-built unique identification number stored in the BMC and the BIB reads this number whenever battery is connected. The BIB keeps track of the battery connected to it by reading the battery identification number and once the system has been commissioned, thereafter the BIB and battery are coupled to each other.

The BIB has a nonvolatile memory, which stores the battery identification number against its own ID number and battery commissioning parameters like charge voltage, discharge current, protection thresholds like overcurrent, battery overvoltage, battery deep discharge, over temperature protection and the capacity of the battery in terms of Amp-hours and wattage.

Whenever the battery is disconnected and reconnected, the BIB reads the battery identification number via the serial bus to verify the valid battery pack.

The BIB measures the battery state of charge (SoC), state of health (SoH) and remaining useful life (RUL) and communicates this parameter to the central energy manager (CEM) via the floor gateway.

The central energy manager, reads the SoC, SoH and RUL information from the luminaire. Depending upon the values of SoC, SoH and RUL, the CEM will not dispatch the load to the battery where SoC, SoH is lesser, instead CEM will deliver to the load from healthier batteries, where the SoH and RUL are higher. The CEM will also notify the utility manager to indicate the battery health for planning of replacements without affecting the overall productivity and schedule.

Once the battery is commissioned and coupled with the BIB, the BIB sends the battery parameters to the CEM with its own ID. If the battery is changed in-between, then the BIB sends an alert to the central energy manager about the change in battery. If this change is planned/intended then the BIB configures the new battery to its discharge requirements. The central energy manager maintains the battery parameters with its identification number and BIB identification numbers of the different luminaires installed with it in a tabular format.

Thus in general, the energy manager uses the battery parameter like SoC and SoH as input for energy algorithms and uses the SoH and RUL information for battery replacements and maintenance service.

Some examples of the battery identification and commissioning functions using the BIB are now explained.

6.1 Identification of the Battery

The battery has a unique identification number as mentioned above. Once commissioned with the luminaire that battery will be mapped with the luminaire and its parameters like SoC, SoH, burn in time and fault parameters are stored in the database.

6.2 Prevent Wrong or Unauthorized Usage of Battery

Identification and coupling of the battery strictly maps the battery with the luminaire, so the user cannot use any other batteries with the system. The luminaire will measure the battery parameters (voltage, Amp-Hour rating etc.) and authenticate the battery by using the unique identification number that is stored in luminaire memory during commissioning. whenever a battery is reconnected to system.

6.3 Prevent Tampering of the Battery in a Service Based Business Model

In the light/energy as service business model, the battery is the key component, so it should be tamper proof, Battery identification and coupling with the system will disable the battery output in the case of a wrong association of the battery with other products. The central energy manager is reported about such incidents.

6.4 Controlling the Charging by Identifying the Battery and its Battery Management Circuit The battery management circuit is a small electronic circuit with a programmable feature. It handles the battery protection and has information about the battery ratings. The BMC communicates with the luminaire via a serial interface and reads this information while connecting the battery. This helps in self-configuring of the charge and discharge profile of the battery. With this feature, charge profile parameters (such as maximum charge current, end of charge voltage, discharge current, protection voltage and current) do not need to be hardcoded in to the BIB or lighting system. Whenever battery is connected, the system reads the battery parameters and adopts its charge/discharge profile and protection thresholds based on the values obtained through the serial communication.

In a usual case, the battery size (capacity) fitted to the luminaire is fixed and its charging profile and protection threshold are fixed or hardcoded to the BIB algorithm. However, the system is able to use a different battery size or capacity based on the installation location or usage pattern. When a luminaire (and its associated BIB) is connected with the battery, the BIB reads the battery capacity and self-configures the charge and discharge cycle and its protection threshold.

For example, in a system installed in an office space, the corridor lighting is more frequently used than lighting of seating locations and meeting rooms. Meeting room lighting is less used compared to seating space and corridor lighting. A system designer can select a lower capacity battery for meeting rooms and a higher capacity battery for corridor luminaire. The system is then able to auto configure the charging profile and protection parameters after detecting and reading the battery parameters.

In this way, each of the system nodes can be connected with a different capacity battery based on the occupancy pattern, which thereby reduces the total system costs 6.5 Battery Related Warranty Claims The coupling of the battery identification number with a system node or luminaire helps in logging usage data and error information during the runtime. This helps in sorting of issues relating to warranty claims by separating the errors due to mishandling of the systems (which is not covered under warranty claims) and issues due the system misbehavior.

The luminaries communicate with the battery management circuit and log the working (operating) parameters of the battery. In the case of a system failure, the service personnel are able to read the data and analyze the cause of failure.

The warranty clauses of the battery cover normal usage of the battery within the recommended operating conditions (such as recommended ambient condition, maximum charge and discharge currents, maximum shelf life). There may also be a requirement for at least one charge cycle to be required if the system is not used for more than a suggested time. Generally a Li-ion battery has to undergo at least one charge cycle in a 3 month period if it is not used for more than 3 months and its SoC is less than 20%. Issues unrelated to the warranty mainly relate to misuse of the system, such as operating the system out of the operating conditions (temperature, battery load types, overloading the battery outputs etc.).

The system also includes standby power reduction.

Particularly, during the on peak and mid peak time slots, the energy charges are high. It is therefore of interest to reduce the standby power from grid during the PIR off time periods.

Generally, whenever the PIR off signal is present, the light output will be turned off and the driver will be in a standby mode, with the communication and monitoring module powered by the AC mains.

The power conversion efficiency of the AC to DC driver 54 is low for this low power demand so that the power loss is high. In a large scale commercial building where thousands of lighting node are connected this is a considerable power loss.

The system may handle this situation in a different way. Whenever the PIR turns off during the grid driving mode of operation, hence during the off peak and mid peak situations, the power source to lighting node may switch to the battery (i.e. battery driving mode) so that there is no standby power drawn from the AC mains.

Whenever the PIR turns on, the system then switches back to the AC mains.

A reduction of power while dimming is also possible. The power conversion efficiency of an AC to DC Led driver is less than a DC to DC converter, and the AC to DC LED driver efficiency is much lower during dimming conditions. Thus, whenever the lighting node is working in dimming mode (for example with dimming to less than a threshold such as 40%) in the off peak and mid peak hours, the lighting node can switch to the battery driving mode of operation irrespective of the input condition, which reduces the power loss.

Figure 13:
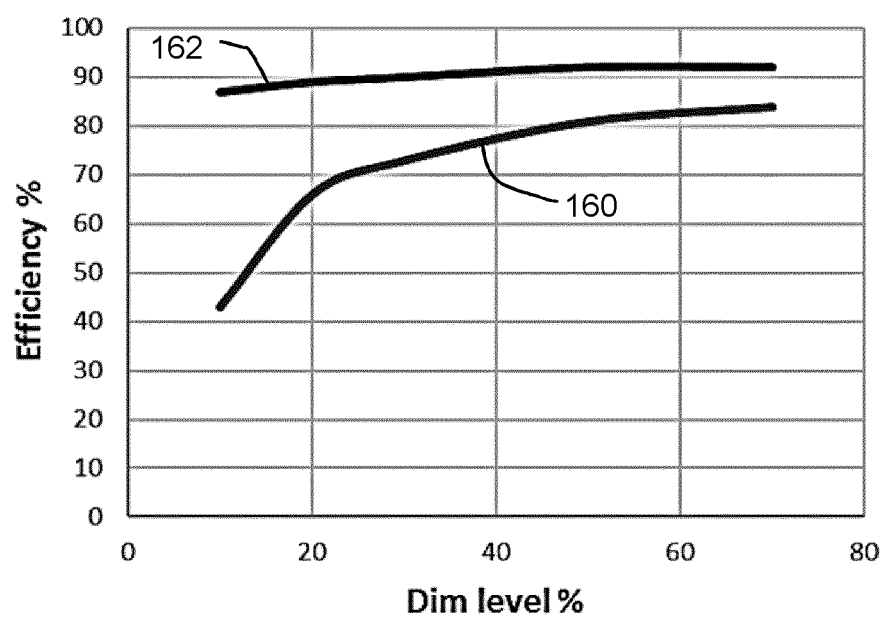
FIG. 13 shows the efficiency (y-axis) of the driver and battery injection box for different dimming levels (x-axis)

FIG. 13 shows the efficiency (y-axis) of the driver and BIB for different dimming levels (x-axis). Plot 160 is for the AC-DC driver and plot 162 is for the DC-DC converter of the BIB. It is evident that when the dim level is less than 40% for example, the AC-DC based converter efficiency is less than 75%. However, the DC-DC based converter of the BIB still has efficiency more than 85%.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A power supply system to be used with a lighting unit, comprising:
 a driver adapted to receive an AC or DC input power supply at an input, and to convert the input power supply into a driving current at an output for supply to the lighting unit;
 an interface to an energy storage device for providing an secondary power supply;
 a converter adapted:
  in a first mode to connect to said output of said driver for diverting at least a part of the driving current from the lighting unit to charge the energy storage device;
  in a second mode to connect to the lighting unit for converting the secondary power supply to drive the lighting unit; and
  in a third mode to drive the lighting unit from a grid at the input without charging or discharging the energy storage device; and
 a controller to actively control said converter and the output of said driver synchronously to maintain the current through the lighting unit when switching the converter between the third mode and one of the first and second modes,
 wherein the controller, when to actively control said converter and the output of said driver synchronously when switching the converter between the third mode and the second mode, is adapted to:
 obtain an output of the converter, and control the output of the driver according to the obtained output of the converter; or
 obtain an output of the driver, and control the output of the converter according to the obtained output of the driver.

2. The system as claimed in claim 1, wherein the lighting unit comprises an LED arrangement, the driver comprises a current source LED driver with an output connectable to the LED arrangement, and in the first mode the converter is adapted to be in parallel with the LED arrangement, wherein the controller is adapted, when to obtain an output of the converter, and control the output of the driver according to the obtained output of the converter, is adapted to:
 a) control the converter to output an output voltage to reach a voltage threshold of the lighting unit while said driver to output the driving current, and then control the driver not deliver the driving current, synchronously with the converter to output the driving current; or
 b) inject current into the lighting unit from the driver and the converter simultaneously;
 sense, in a control loop of the driver, the total current through the lighting unit including the output current of the converter;
 change the output current of the converter; and
 allow the control loop of the driver to change an output current of the converter to maintain the total current.

3. The system as claimed in claim 1, wherein the controller is adapted, when to obtain an output of the driver, and control the output of the converter according to the obtained output of the driver, to:
 c) inject current into the lighting unit from the driver and the converter simultaneously;
 sense, in a control loop of the converter, the total current through the lighting unit including the output current of the driver;
 change the output current of the driver;
 allow the control loop of the converter to change an output current of the converter to maintain the total current.

4. The system as claimed in claim 2, wherein the power supply system is operable in:
 a first state in which the driver is adapted to deliver the driving current to the lighting unit, and the converter is adapted to, in the third mode, not operate;
 a second state in which the driver is adapted to deliver the driving current to the lighting unit, and the converter is adapted to be in a start-up mode during which the converter is adapted to output a converter output voltage and increase a conversion ratio of the converter until the converter output voltage reaches a voltage threshold of the lighting unit; and
 a third state in which the converter is adapted to output the converter output voltage that has reached the voltage threshold of the lighting unit and to proceed to operate in the second mode, and the driver is adapted to not deliver the driving current, synchronously.

5. The system as claimed in claim 4, wherein in the third state, the converter is adapted to increase the conversion ratio until the driving current through the lighting unit in a preceding first state is restored in the second mode.

6. The system as claimed in claim 4, wherein the controller is adapted to switch the system between the first, second and third states in response to a high demand duration in the input power supply or to a demand response call from a utility providing the input power supply.

7. The system as claimed in claim 4, the power supply system is operable in:
- a fourth state in which the converter is adapted to deliver the driving current in the second mode, and the driver is adapted to not deliver the driving current;
- a fifth state in which the converter is adapted to deliver the driving current to the lighting unit, and the driver is adapted to be in a start-up mode during which the driver is adapted to output a driver output voltage to reach the voltage threshold of the lighting unit; and
- a sixth state in which the driver is adapted to deliver the driving current to the lighting unit, and the converter is adapted to, in the third mode, not operate.

8. The system as claimed in claim 1, wherein the power supply system is operable in:
- a first state in which the driver is adapted to deliver the driving current to the lighting unit, and the converter is adapted to, in the third mode, not operate: and
- a seventh state in which the controller is adapted to instruct the driver to increase the driving current at the output, and to instruct the converter to start to operate in the first mode, synchronously;
- wherein the converter is adapted to, in the first mode, detect the current through the lighting unit, and tune the part of the driving current from the driver diverted from the lighting unit to charge the energy storage device such that the current through the lighting unit is still constant.

9. The system as claimed in claim 8, wherein the controller is adapted to operate the system from the first state to the seventh state in response to a low demand duration in the input power supply.

10. The system as claimed in claim 8, wherein the controller is adapted to instruct the driver to increase the driving current at the output step by step, and to instruct the converter to increase the part of the driving current from the driver diverted from the lighting unit step by step, and the power supply system is operable in an eighth state in which the controller is adapted to instruct the driver to decrease the driving current at the output step by step, and to instruct the converter to decrease the part of the driving current from the driver diverted from the lighting unit step by step, synchronously.

11. The system as claimed claim 1, wherein the converter is a bi-directional switched mode power converter.

12. The system as claimed in any claim 11, wherein the converter is a bi-directional buck/boost converter wherein the converter is a buck converter from the output of the driver to the energy storage device and is a boost converter from the energy storage device to the lighting unit.

13. The luminaire comprising:
- a lighting unit; and
- a power supply system as claimed in claim 1.

14. The lighting system comprising:
- a plurality of luminaires each as claimed in claim 13;
- a plurality of energy storage devices, each associated with a respective luminaire via the interface; and
- a remote server to communicate with the controller of the power supply system of each luminaire.

15. The lighting system according to claim 14, wherein said remote server and said controller are adapted to communicate via a wireless protocol, and said wireless protocol comprises ZigBee protocol, and the lighting system further comprises:
- a ZigBee gateway adapted to connect said remote server via a wired network, and connect to said controller via the ZigBee protocol; and
- wherein said controller of said luminaire comprises a DALI module to receive command in ZigBee protocol and to control the driver and the converter via DALI protocol.

* * * * *